(12) United States Patent
Lee et al.

(10) Patent No.: US 12,444,132 B2
(45) Date of Patent: Oct. 14, 2025

(54) ELECTRONIC DEVICE AND METHOD OF PROVIDING CONTENT SHARING BASED ON OBJECT

(71) Applicant: Samsung Electronics Co., Ltd., Suwon-si (KR)

(72) Inventors: Kanghee Lee, Suwon-si (KR); Gajin Song, Suwon-si (KR); Dongchoon Hwang, Suwon-si (KR); Kyungtae Kim, Suwon-si (KR); Hoseon Shin, Suwon-si (KR); Woojung Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 177 days.

(21) Appl. No.: 18/449,961

(22) Filed: Aug. 15, 2023

(65) Prior Publication Data
US 2024/0087220 A1    Mar. 14, 2024

Related U.S. Application Data

(63) Continuation of application No. PCT/KR2023/010239, filed on Jul. 18, 2023.

(30) Foreign Application Priority Data

Sep. 8, 2022  (KR) .................. 10-2022-0114514
Oct. 27, 2022  (KR) .................. 10-2022-0140373

(51) Int. Cl.
*G06T 17/00*       (2006.01)
*G06F 3/04815*    (2022.01)
(Continued)

(52) U.S. Cl.
CPC .......... *G06T 17/00* (2013.01); *G06F 3/04815* (2013.01); *G06F 3/14* (2013.01); *G06F 21/6218* (2013.01); *G06F 2221/2141* (2013.01)

(58) Field of Classification Search
CPC ....... G06T 17/00; G06F 3/04815; G06F 3/14; G06F 21/6218; G06F 2221/2141; G06F 3/011
See application file for complete search history.

(56) References Cited

U.S. PATENT DOCUMENTS 6,772,195 B1 * 8/2004 Hatlelid .............. G06F 3/04815
                                                                  709/224
9,728,009 B2    8/2017 Boussard et al.
(Continued)

FOREIGN PATENT DOCUMENTS

KR  10-2010-0009947    1/2010
KR  101694159 B1       1/2017
(Continued)

OTHER PUBLICATIONS

Search Report dated Oct. 18, 2023 issued in International Patent Application No. PCT/KR2023/010239.

*Primary Examiner* — Jitesh Patel
(74) *Attorney, Agent, or Firm* — NIXON & VANDERHYE P.C.

(57) ABSTRACT

A server for providing content shared to an object is provided. The server is configured to establish communication between a first electronic device of a user and a second electronic device of another user and provide, to the first electronic device and the second electronic device, a virtual space and an object in the virtual space. The server selects, based on an input of the user, at least one content shared to the object in the virtual space by the other user of the second electronic device entering the same virtual space as the first electronic device. The server activates the object to identically output the selected content to at least one electronic device entering the virtual space. Based on the second
(Continued)

electronic device leaving the virtual space, the server stops providing the content shared by the other user.

18 Claims, 15 Drawing Sheets

(51) Int. Cl.
  *G06F 3/14* (2006.01)
  *G06F 21/62* (2013.01)

(56) References Cited

U.S. PATENT DOCUMENTS

| | | | |
|---|---|---|---|
| 10,169,921 | B2 | 1/2019 | Jayaraj et al. |
| 10,430,558 | B2 | 10/2019 | Breitenfeld et al. |
| 2013/0174223 | A1* | 7/2013 | Dykeman ............... G06F 21/10 |
| | | | 726/4 |
| 2014/0115140 | A1 | 4/2014 | Jin |
| 2017/0039770 | A1* | 2/2017 | Lanier ................... H04W 12/02 |
| 2017/0322693 | A1* | 11/2017 | Zhang ................... G06F 3/0484 |
| 2018/0342106 | A1* | 11/2018 | Rosado ............... G06Q 10/109 |

FOREIGN PATENT DOCUMENTS

| | | |
|---|---|---|
| KR | 10-2019-0004088 | 1/2019 |
| KR | 10-2019-0029398 | 3/2019 |
| KR | 102189924 B1 | 12/2020 |
| KR | 10-2021-0046626 | 4/2021 |
| KR | 102281601 B1 | 7/2021 |
| WO | 2022/087147 | 4/2022 |

\* cited by examiner

ELECTRONIC DEVICE AND METHOD OF PROVIDING CONTENT SHARING BASED ON OBJECT

CROSS-REFERENCE TO RELATED APPLICATIONS

This application is a continuation application of International Application No. PCT/KR2023/010239 designating the United States, filed on Jul. 18, 2023, in the Korean Intellectual Property Receiving Office and claiming priority to Korean Patent Application No. 10-2022-0114514, filed on Sep. 8, 2022 and Korean Patent Application No. 10-2022-0140373, filed on Oct. 27, 2022, in the Korean Intellectual Property Office, the disclosures of which are incorporated by reference herein in their entireties.

BACKGROUND

1. Field

The disclosure relates to content sharing based on an object.

2. Description of Related Art

Recently, computer graphics-applied virtual reality (VR), augmented reality (AR), and mixed reality (MR) technologies are in development. The VR technology may construct a virtual space that does not exist in a real world using a computer and provide users with the virtual space to allow them to feel it as real, and the AR or MR technology may add information generated by a computer into the real world to express it, that is, combine the real world and the virtual world to allow users to interact therein in real time.

Among these, the AR and MR technologies are used in conjunction with technologies in various fields, for example, broadcasting, medical field, and game. Representative examples of such applications of the AR technology may include, for example, a case in which a weather map in front of a weather forecaster who gives a weather forecast on a television (TV) changes naturally or a case in which an advertisement image that is not actually present in a sports stadium is inserted in and transmitted onto the screen as if it is actually present in the stadium during sports broadcasting.

A metaverse is a representative service that provides AR and MR. The metaverse, a compound of "meta" which may refer to processing and abstraction and "universe" which may refer to the real world, may refer to a three-dimensional (3D) virtual world. The metaverse, a concept that is more advanced than the term indicating an existing VR environment, may provide an AR environment in which a virtual world on the web or the internet is absorbed into the real world.

SUMMARY

According to an example embodiment, a server includes: a communication module comprising communication circuitry configured to establish communication between a first electronic device of a user and a second electronic device of another user and provide, to the first electronic device and the second electronic device, a virtual space and an object in the virtual space, a memory configured to store computer-executable instructions, and a processor configured to execute the instructions by accessing the memory. The instructions, when executed, are further configured to cause the processor to: select, based on an input, at least one content shared to the object in the virtual space by the other user of the second electronic device entering the same virtual space as the first electronic device. The instructions, when executed, are further configured to cause the processor to activate the object to identically output the selected content to at least one electronic device entering the virtual space. The instructions, when executed, are further configured to, based on the second electronic device leaving the virtual space, cause the processor to stop providing the content shared by the other user.

According to an example embodiment, a method implemented by a processor includes: selecting, based on an input, at least one content shared to an object in a virtual space by another user of a second electronic device entering the same virtual space as a first electronic device. The method includes activating the object to identically output the selected content to at least one electronic device entering the virtual space. The method includes, based on the second electronic device leaving the virtual space, stopping providing the content shared by the other user.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
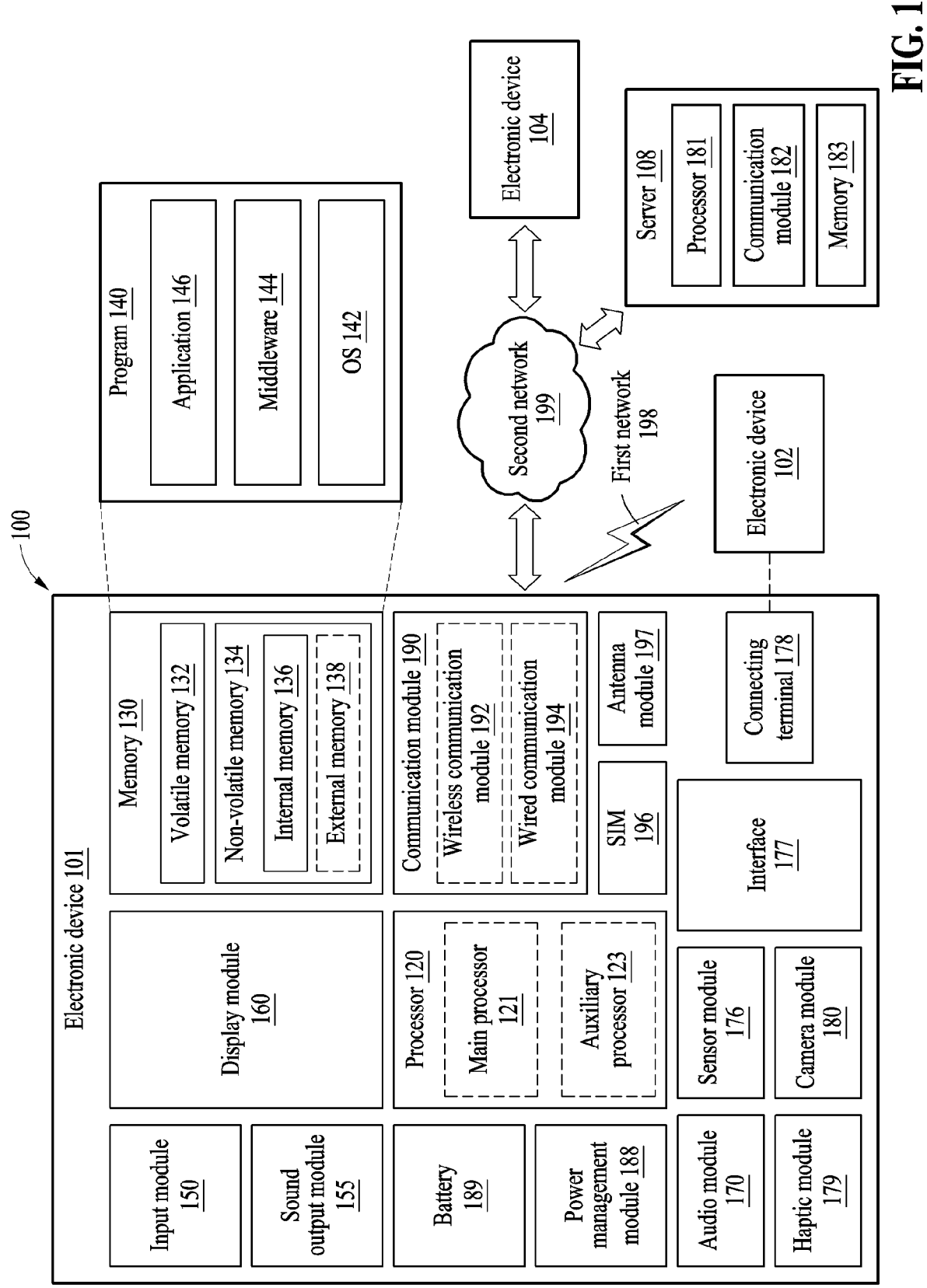
FIG. 1 is a block diagram illustrating an example configuration of an electronic device in a network environment according to various embodiments.

Hereinafter, various example embodiments will be described in greater detail with reference to the accompanying drawings. When describing the examples with reference to the accompanying drawings, like reference numerals refer to like components and a repeated description related thereto may not be repeated.

FIG. 1 is a block diagram illustrating an example configuration of an electronic device in a network environment according to various embodiments.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the above components may be omitted from the electronic device 101, or one or more other components may be added to the electronic device 101. In various embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated through machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 (e.g., a display) may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electrical signal or vice versa. According to an embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., a mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199.

Each of the external electronic devices 102, 104 or 108 may be a device of the same type as or a different type from the electronic device 101. According to an embodiment, all or some of operations to be executed by the electronic device 101 may be executed at one or more of the external electronic devices 102, 104, or 108. For example, if the electronic device 101 needs to perform a function or a service automatically, or in response to a request from a user or another device, the electronic device 101, instead of, or in addition to, executing the function or the service, may request one or more external electronic devices to perform at least portion of the function or the service. The one or more external electronic devices receiving the request may perform the at least part of the function or the service requested, or an additional function or an additional service related to the request, and may transfer an outcome of the performing to the electronic device 101. The electronic device 101 may provide the result, with or without further processing the result, as at least part of a response to the request. In the present disclosure, an example that the electronic device 101 is an augmented reality (AR) device (e.g., an electronic device 201 of FIG. 2, an electronic device 301 of FIG. 3, or among electronic device 401 of FIG. 4) and the server 108 among the external electronic devices 102, 104, or 108 transmits, to the electronic device 101, a result of executing a virtual space and a service or an additional function related to the virtual space is described.

The server 108 may include a processor (e.g., including processing circuitry) 181, a communication module (e.g., including communication circuitry) 182, and a memory 183. The processor 181, the communication module 182, and the memory 183 may be similarly configured to the processor 120, the communication module 190, and the memory 130 of the electronic device 101. For example, the processor 181 may include various processing circuitry and provide a virtual space and an interaction between users in the virtual space by executing instructions stored in the memory 183. The processor 181 may generate at least one of visual information, auditory information, or tactile information of a virtual space and an object in the virtual space. For example, as visual information, the processor 181 may generate rendered data (e.g., visually rendered data) that renders an appearance (e.g., a shape, size, color, or texture) of a virtual space and an appearance (e.g., a shape, size, color, or texture) of an object in the virtual space. In addition, the processor 181 may generate rendered data that renders an interaction between objects (e.g., a physical object, a virtual object, or an avatar object) in the virtual space or a change (e.g., a change in an appearance of an object, occurrence of sound, or occurrence of tactile sensation) based on one or more user inputs to an object (e.g., a physical object, a virtual object, or an avatar object). The communication module 182 may establish communication between a first electronic device (e.g., the electronic device 101) of a user and a second electronic device (e.g., the electronic device 102) of another user. The communication module 182 may include various communication circuitry and transmit at least one of visual information, tactile information, or auditory information described above to the first electronic device and the second electronic device. For example, the communication module 182 may transmit rendered data.

For example, after rendering content data executed by an application, the server 108 may transmit the content data to the electronic device 101 and the electronic device 101 receiving the data may output the content data to the display module 160. When the electronic device 101 detects a movement of a user through an inertial measurement unit (IMU) sensor or the like, the processor 181 of the electronic device 101 may correct the rendering data received from the external electronic device 102 based on the movement information and output the corrected movement information to the display module 160. Alternatively, the processor may transmit the movement information to the external electronic device 108 to request rendering such that screen data is updated accordingly. However, the example is not limited thereto and rendering described above may be performed by various types of the external electronic devices 102 and 104, such as a case device for storing and charging a smartphone or the electronic device 101. Rendered data that is generated by the external electronic device 102 and 104 and corresponds to the virtual space described above may be provided to the electronic device 101. For example, the electronic device 101 may receive, from the server 108, information on the virtual space (e.g., vertex coordinates defining the virtual space, the texture, and a color) and object information (e.g., vertex coordinates defining an appearance of an object, the texture, and a color) and may perform rendering by itself based on the received data.

Figure 2:
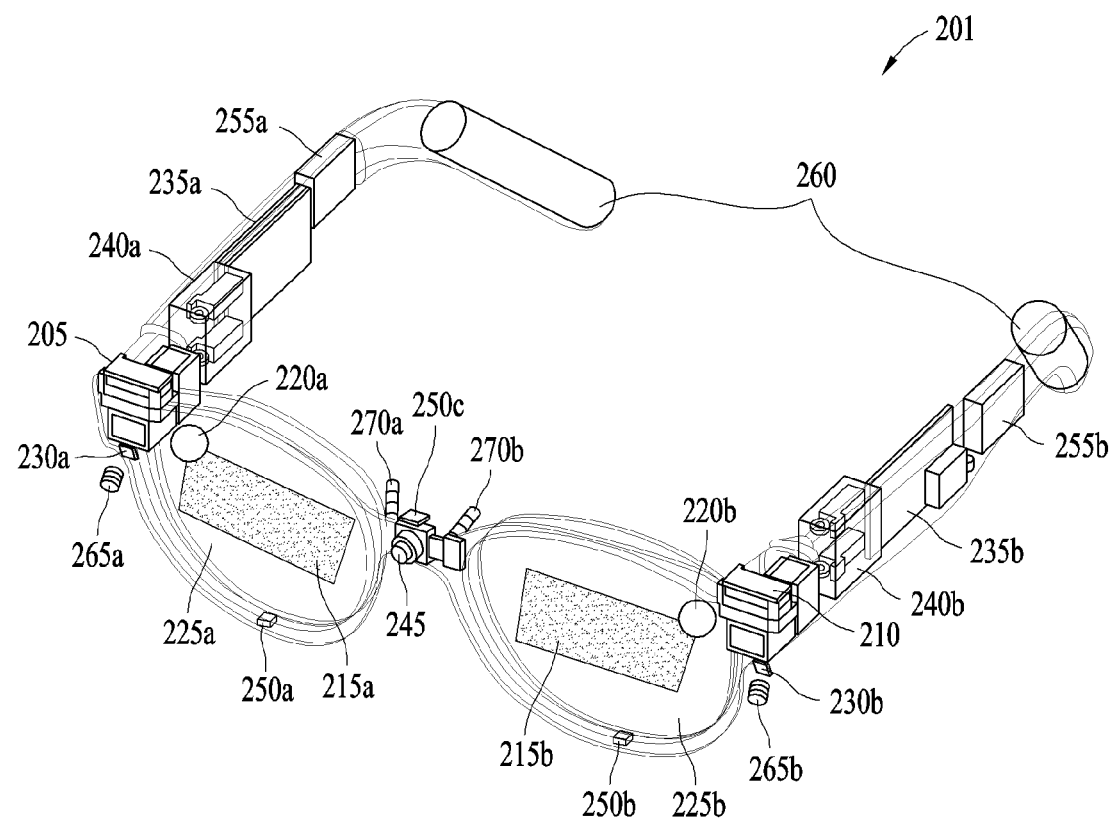
FIG. 2 is a perspective view illustrating an optical see-through device according to various embodiments.

FIG. 2 is a diagram illustrating an example optical see-through device according to various embodiments.

An electronic device 201 may include at least one of a display (e.g., the display module 160 of FIG. 1), a vision sensor, light sources 230a and 230b, an optical element, or a substrate. The electronic device 201 of which the display is transparent and provides an image through the transparent display may be referred to as an optical see-through (OST) device.

For example, the display may include a liquid crystal display (LCD), a digital mirror device (DMD), or a liquid crystal on silicon (LCoS), an organic light-emitting diode (OLED), or a micro light-emitting diode (micro LED). Although not shown in the drawings, when the display is one of an LCD, a DMD, or an LCoS, the electronic device 201 may include the light sources 230a and 230b emitting light to a screen output area (e.g., screen display portions 215a and 215b) of the display. According to an embodiment, when the display is capable of generating light by itself, for example, when the display is either an OLED or a micro LED, the electronic device 201 may provide a virtual image with a relatively high quality to the user even though a separate light source 230a or 230b is not included. In an example embodiment, when the display is implemented as an OLED or a micro LED, a light source 230a or 230b may be unnecessary, and accordingly the electronic device 201 may be reduced in weight.

Referring to FIG. 2, the electronic device 201 may include a display, a first transparent member 225a and/or a second transparent member 225b. A user may use the electronic device 201 while wearing the electronic device 201 on their face. The first transparent member 225a and/or the second transparent member 225b may be formed of a glass plate, a plastic plate, or a polymer, and may be transparently or translucently formed. According to an embodiment, the first transparent member 225a may be disposed to face the right eye of the user, and the second transparent member 225b may be disposed to face the left eye of the user. The display may include a first display 205 configured to output a first image (e.g., a right image) corresponding to the first transparent member 225a and a second display 210 configured to output a second image (e.g., a left image) corresponding to the second transparent member 225b. According to an embodiment, when each of the displays is transparent, the displays and transparent members may be disposed at positions facing the user's eyes to configure the screen display portions 215a and 215b.

In an example embodiment, the light emitted from the display 205 or 210 may be guided by the waveguide through the input optical member 220a or 220b. Light moving into the display waveguide may be guided toward eyes of a user through an output optical member (e.g., an output optical member 340 of FIG. 3). The screen display portions 215a and 215b may be determined based on light emitted in a direction of the eyes of the user.

For example, the light emitted from the first display 205 and/or the second display 210 may be reflected from a grating area of the waveguide formed in the input optical members 220 or 220b and the screen display portion 215a, 215b, and may be transmitted to the eye of the user.

The optical element may include at least one of a lens or an optical waveguide.

The lens may adjust a focus such that a screen output to the display is visible to the eyes of the user. The lens may include, for example, at least one of a Fresnel lens, a pancake lens, or a multichannel lens.

The optical waveguide may transmit an image ray generated by the display to the eyes of the user. For example, the image ray may represent a ray of light that is emitted by the light source 230a or 230b and passes through the screen output area of the display. The optical waveguide may be formed of glass, plastic, or polymer. The optical waveguide may include a nanopattern formed on a portion of an inner surface or a portion of an outer surface, for example, a grating structure of a polygonal or a curved shape. An example structure of the waveguide is described in greater detail below with reference to FIG. 3.

The vision sensor may include at least one of a camera or a depth sensor.

The first camera 265a or 265b may be a recognition camera and may be a camera used for 3 degrees of freedom (DoF) or 6DoF head tracking, hand detection, hand tracking, and space recognition. The first camera 265a or 265b may include a global shutter (GS) camera. Since a stereo camera is required for head tracking and space recognition, the first camera 265a or 265b may include two or more GS cameras. The GS camera may have better performance than a rolling shutter (RS) camera in an aspect of detecting fine movement, such as a rapid hand gesture and a finger, and tracking movement. For example, the GS camera may have low image blur. The first camera 265a or 265b may capture image data used for a simultaneous localization and mapping (SLAM) function through depth capturing and space recognition for 6DoF. In addition, a user gesture recognition function may be performed based on image data captured by the first camera 265a or 265b.

Figure 3:
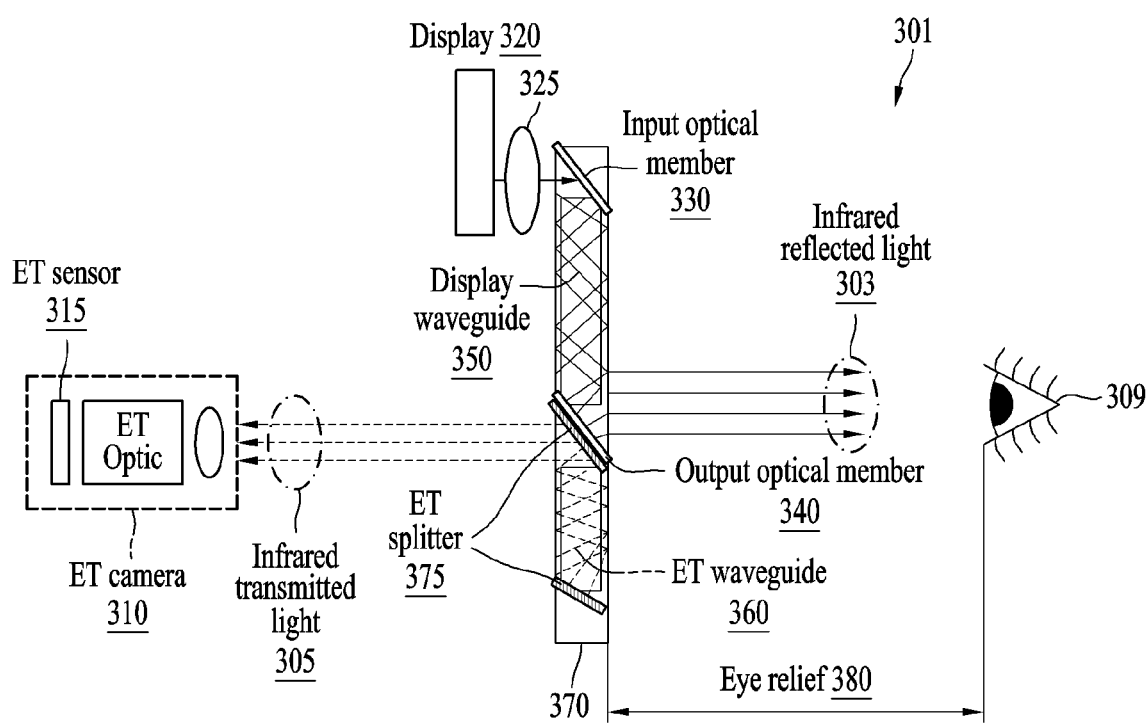
FIG. 3 is a diagram illustrating an example of an optical system for an eye tracking camera, a transparent member, and a display according to various embodiments.

The second camera 270a or 270b may be an eye tracking (ET) camera and may be used to capture image data for detecting and tracking the pupil of the user. The second camera 270a or 270b is described with reference to FIG. 3 shown below.

A third camera 245 may be a photographing camera. According to an embodiment, the third camera 245 may include a high-resolution (HR) camera for capturing an HR or a photo video (PV) image. The third camera 245 may include a color camera equipped with functions to obtain a high-quality image, such as an auto focus (AF) function and optical image stabilization (OIS), and the like. The third camera 245 may be a GS camera or an RS camera.

A fourth camera unit (e.g., a face recognition camera 430 of FIG. 4) may be a face recognition camera and a face tracking (FT) camera may be used to detect and track a facial expression of a user.

A depth sensor (not shown) may be a sensor configured to sense information for determining a distance from an object, such as time of flight (TOF). The TOF may be a technique of measuring a distance of an object using a signal (e.g., a near infrared ray, an ultrasound wave, a laser, and the like). A depth sensor based on the TOF technique may transmit a signal from a transmitter, may measure the signal in a receiver, and may measure a TOF of the signal.

The light source 230a or 230b (e.g., an illumination module) may include an element (e.g., an LED) emitting light of various wavelengths. The illumination module may be attached to various positions depending on the purpose. For example, a first illumination module (e.g., an LED element) attached to a periphery of a frame of an AR glasses device may emit light for assisting gaze detection when tracking eye movement with an ET camera. The first illumination module may include an IR LED of an infrared wavelength, as an example. For example, a second illumination module (e.g., an LED element) may be attached to a camera mounted on a periphery of a bridge connecting frames to each other or a periphery of a hinge 240a or 240b connecting a frame to a temple. The second illumination module may emit light for compensating ambient brightness during camera shooting. When a subject is not easily detected in a dark environment, the second illumination module may emit light.

A substrate 235a or 235b (e.g., a PCB) may support the aforementioned components.

The PCB may be disposed on a temple of glasses. A flexible PCB (FPCB) may transmit an electrical signal to each module (e.g., a camera, a display, an audio module, and a sensor module) and another PCB. According to an embodiment, at least one PCB may include a first substrate, a second substrate, and an interposer disposed between the first substrate and the second substrate. For example, the PCB may be disposed on a central portion of a set. An electrical signal may be transmitted to each module and another PCB through the FPCB.

Other components may include, for example, at least one of a plurality of microphones (e.g., a first microphone 250a, a second microphone 250b, a third microphone 250c), a plurality of speakers (e.g., a first speaker 255a and a second speaker 255b), a battery 260, an antenna, or a sensor (e.g., an acceleration sensor, a gyro sensor, and a touch sensor).

FIG. 3 is a diagram illustrating an example of an optical system for an ET camera, a transparent member, and a display according to various embodiments.

FIG. 3 is a diagram illustrating an operation of an ET camera included in an electronic device according to an embodiment. FIG. 3 illustrates a process in which an ET camera 310 (e.g., the first ET camera 270a, the second ET camera 270b of FIG. 2) of an electronic device 301 according to an embodiment tracks the eye 309 of the user, that is, a gaze of the user, using light (e.g., infrared light) output from a display 320 (e.g., the first display 205 and the second display 210 of FIG. 2).

A second camera (e.g., the second camera 270a or 270b of FIG. 2) may be the ET camera 310 for collecting information for positioning the center of a virtual image projected onto the electronic device 301 in a direction in which the pupil of a wearer of the electronic device 301 gazes. The second camera may include a GS camera to detect a pupil and track rapid pupil movement. ET cameras may each be installed for the left eye and the right eye and camera performance and specification thereof may be the same. The ET camera 310 may include an eye gaze tracking sensor 315. The eye gaze tracking sensor 315 may be included inside the ET camera 310. Infrared light output from the display 320 may be transmitted to an eye 309 of a user as reflected infrared light 303 by a half mirror. The eye gaze tracking sensor 315 may sense transmitted infrared light 305 which is reflected infrared light 303 reflected from the eye 309 of the user. The ET camera 310 may track the eye 309 of the user, that is, the gaze of the user, based on a detection result of the eye gaze tracking sensor 315.

The display 320 may include a plurality of visible light pixels and a plurality of infrared pixels. The visible light pixels may include R, G, and B pixels. The visible light pixels may output visible light corresponding to a virtual object image. The infrared pixels may output infrared light. The display 320 may include, for example, micro LEDs, or OLEDs.

The display waveguide 350 and an ET waveguide 360 may be included in a transparent member 370 (e.g., the first transparent member 225a and the second transparent member 225b of FIG. 2). The transparent member 370 may be formed as, for example, a glass plate, a plastic plate, or polymer and may be transparently or translucently formed. The transparent member 370 may be disposed to face an eye of a user. In this case, a distance between the transparent member 370 and the eye 309 of the user may be referred to as an "eye relief" 380.

The transparent member 370 may include the waveguides 350 and 360. The transparent member 370 may include an input optical member 330 and an output optical member 340. In addition, the transparent member 370 may include an ET splitter 375 that splits input light into several waveguides.

According to an embodiment, light incident to one end of the display waveguide 350 may be propagated in the display waveguide 350 by a nanopattern and may be provided to a user. In addition, the display waveguide 350 formed of a free-form prism may provide incident light as an image ray to a user through a reflection. The display waveguide 350 may include at least one diffractive element (e.g., a diffractive optical element (DOE) and a holographic optical element (HOE)) or at least one reflective element (e.g., a reflection mirror). The display waveguide 350 may induce, to the user's eye, a display ray (e.g., an image ray) emitted from a light source using at least one diffractive element or reflective element included in the display waveguide 350. For reference, in addition, FIG. 3 illustrates that the output optical member 340 is separate from the ET waveguide 360. However, the output optical member 340 may also be included in the ET waveguide 360.

According to an embodiment, the diffractive element may include the input optical member 330 and an output optical member 340. For example, the input optical member 330 may refer to an input grating area. The output optical member 340 may refer to an output grating area. The input grating area may function as an input terminal which diffracts (or reflects) light output from a display (e.g., a micro LED) to a transparent member (e.g., a first transparent member and a second transparent member) of a screen display portion. The output grating area may function as an exit that diffracts (or reflects), to the user's eye, light transmitted to a transparent member (e.g., the first transparent member and the second transparent member) of the waveguide.

According to an embodiment, a reflective element may include a total reflection waveguide or a total reflection optical element for total internal reflection (TIR). For example, TIR, which is one of schemes for inducing light, may form an angle of incidence such that light (e.g., a virtual image) entering through the input grating area is completely reflected from one surface (e.g., a specific surface) of the waveguide, to completely transmit the light to the output grating area.

According to an embodiment, the light emitted from the display 320 may be guided by the waveguide via a lens 325 through the input optical member 330. Light traveling in the waveguide may be guided toward the eyes of the user through the output optical member 340. A screen display portion may be determined based on the light emitted toward the eyes of the user.

Figure 4:
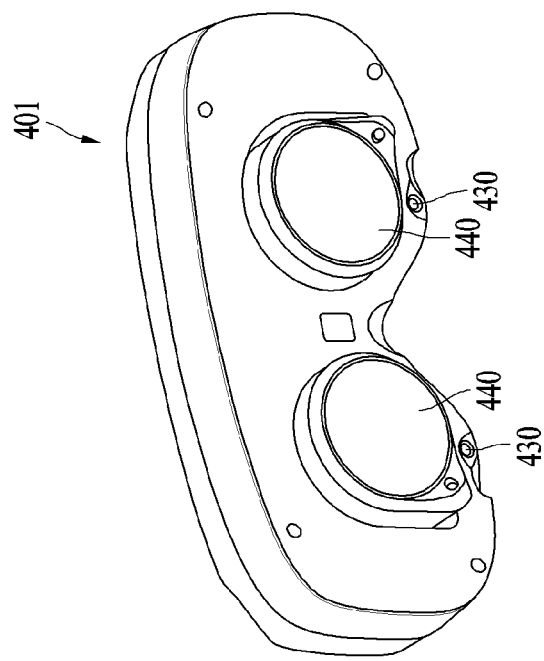
FIG. 4 includes perspective views illustrating a video see-through device according to various embodiments.
Figure 4:
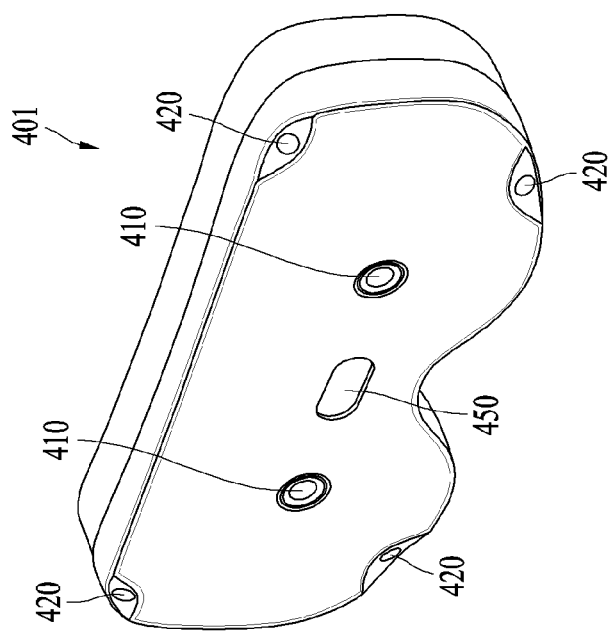

FIG. 4 includes perspective views illustrating an example video see-through device according to various embodiments.

An example that the display is transparent is described with reference to FIGS. 2 and 3, but the example is not limited thereto. Referring to FIG. 4, an electronic device 401 may include an opaque display 440. The electronic device 401 may generate a scene image corresponding to a field of view (FOV) of a user based on image data captured using camera sensors 410 and 420 (e.g., the first cameras 265a and 265b or the third camera 245 of FIG. 2). The electronic device 401 may output the generated scene image through the opaque display 440. The electronic device 401 may provide a scene image corresponding to a left eye FOV to the left eye of a user and may provide a scene image corresponding to a right eye FOV to the right eye of the user through the display 440 and an individual lens. Accordingly, the user may be provided with visual information corresponding to the FOV through a video image provided based on the camera, the display 440, and the lens. The electronic device 401 of FIG. 4 may be referred to as a video see-through (VST) device. The electronic device 401 may include a face recognition camera 430.

For reference, in the electronic device 401 of FIG. 4, the arrangement of the camera sensors 410 and 420, a depth sensor 450, the display 440, or the lens is an example and the example is not limited to the drawings.

Figure 5:
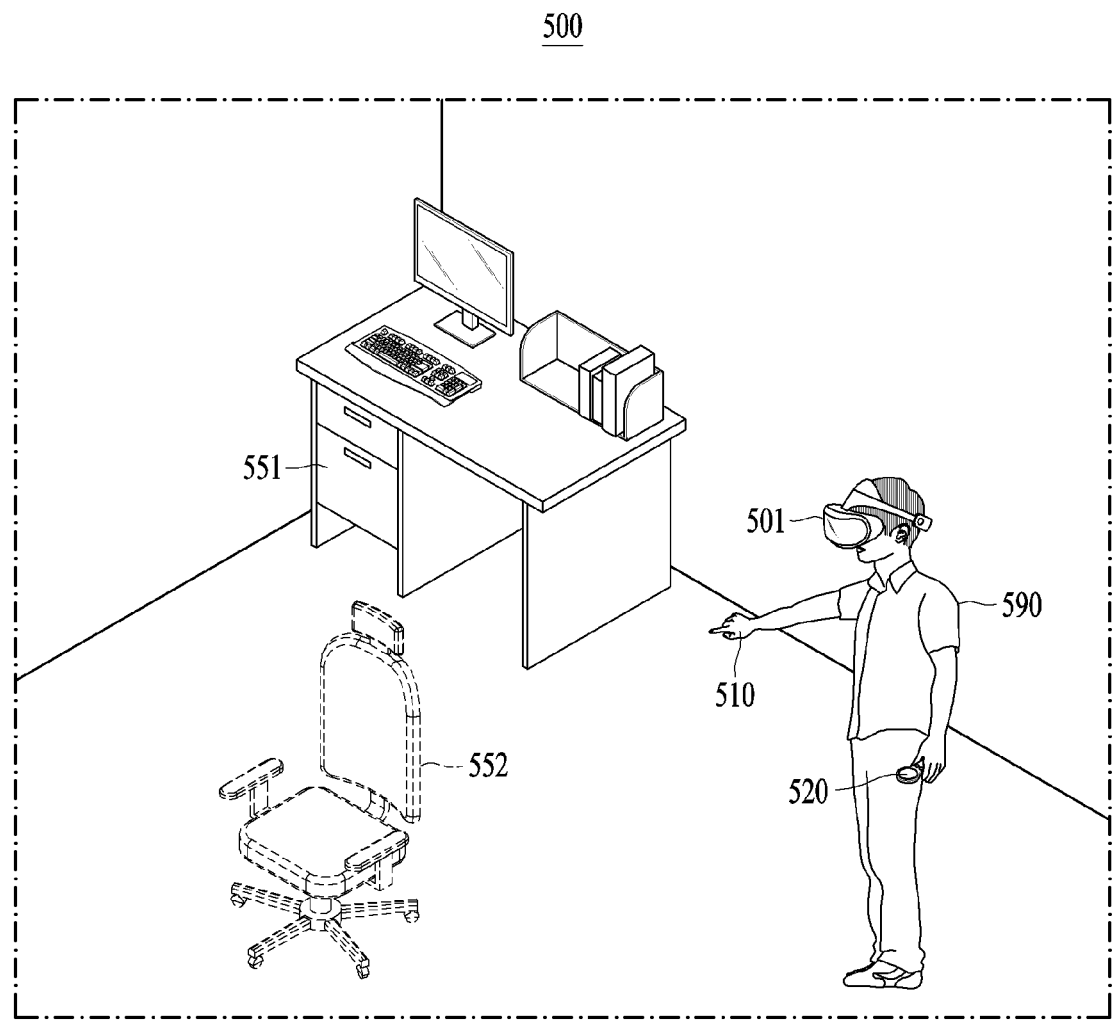
FIG. 5 is a diagram illustrating a virtual space, an input from a user in the virtual space, and an output with respect to the user, according to various embodiments.

FIG. 5 is a diagram illustrating an example virtual space, an input from a user in the virtual space, and an output with respect to the user, according to various embodiments.

An electronic device (e.g., the electronic device 101 of FIG. 1, the electronic device 201 of FIG. 2, the electronic device 301 of FIG. 3, and the electronic device 401 of FIG. 4) may obtain spatial information on a physical space where a sensor is disposed using the sensor. The spatial information may include a geographic position of a physical space where the sensor is disposed, the size of the space, an appearance of the space, a position of a physical object 551 disposed in the space, the size of the physical object 551, an appearance of the physical object 551, and illuminant information. The appearances of the space and the physical object 551 may include at least one of the shape, texture, or color of the space and the physical object 551. The illuminant information may be information on a light source that emits light applied to the physical space and may include at least one of an intensity, a direction, or a color of a lighting device. The sensor described above may collect information to provide AR. For example, with reference to the AR device illustrated in FIGS. 2 to 4, the sensor may include a camera and a depth sensor. However, the example is not limited thereto and the sensor may further include at least one of an infrared sensor, a depth sensor (e.g., a lidar sensor, a radar sensor, or a stereo camera), a gyro sensor, an acceleration sensor, or a geomagnetic sensor.

An electronic device 501 may collect spatial information over multiple time frames. For example, in each time frame, the electronic device 501 may collect information on a space of apart included in a scene within a sensing range (e.g., an FOV range) of a sensor at a position of the electronic device 501 in a physical space. The electronic device 501 may track a change (e.g., a position movement or a state change) of an object over time by analyzing the spatial information of multiple time frames. The electronic device 501 may obtain integrated spatial information (e.g., an image that spatially stitches scenes around the electronic device 501 in the physical space) with respect to an integrated sensing range of a plurality of sensors by comprehensively analyzing spatial information collected by the plurality of sensors.

The electronic device 501 according to an embodiment may analyze a physical space as three-dimensional (3D) information using various input signals (e.g., sensing data of an RGB camera, infrared sensor, depth sensor, or stereo camera) of sensors. For example, the electronic device 501 may analyze at least one of the shape, size, or position of the physical space and the shape, size, or position of the physical object 551.

For example, the electronic device 501 may detect an object captured in a scene corresponding to a FOV of a camera using sensing data (e.g., a captured image) of the camera. The electronic device 501 may determine a label (e.g., information indicating the classification of an object, including a value indicating a chair, monitor, or plant) of a physical object 551 and an area (e.g., a bounding box) occupied by the physical object 551 within a two-dimensional (2D) scene from a 2D scene image of the camera. Accordingly, the electronic device 501 may obtain 2D scene information at a position viewed by the user 590. In addition, the electronic device 501 may also calculate a position of the electronic device 501 in the physical space based on the sensing data of the camera.

The electronic device 501 may obtain position information of the user 590 and depth information of a real space in a viewing direction using sensing data (e.g., depth data) of a depth sensor. The depth information may be information indicating a distance from the depth sensor to each point and may be expressed in the shape of a depth map. The electronic device 501 may analyze a distance of each pixel unit from a 3D position viewed by the user 590.

The electronic device 501 may obtain information including a 3D point cloud and a mesh using various sensing data. The electronic device 501 may obtain a plane, a mesh, or a 3D coordinate point cluster that configures a space by analyzing the physical space. The electronic device 501 may obtain a 3D point cloud representing physical objects based on the information obtained as described above.

The electronic device 501 may obtain information including at least one of 3D position coordinates, 3D shapes, or 3D sizes (e.g., 3D bounding boxes) of the physical objects disposed in the physical space by analyzing the physical space.

Accordingly, the electronic device 501 may obtain physical object information detected in the 3D space and semantic segmentation information on the 3D space. The physical object information may include at least one of a position, an appearance (e.g., the shape, texture, and color), or the size of the physical object 551 in the 3D space. The semantic segmentation information may be information that semantically segments the 3D space into a partial space and may include, for example, information representing that the 3D space is segmented into an object and a background and information representing that the background is segmented into a wall, a floor, and a ceiling. As described above, the electronic device 501 may obtain and may store 3D information (e.g., spatial information) on the physical object 551 and the physical space. The electronic device 501 may store the spatial information together with 3D position information of a user 590 in a space.

The electronic device 501 according to an embodiment may build a virtual space 500 based on a physical position of the user 590 and/or the electronic device 501. The electronic device 501 may generate the virtual space 500 with reference to the spatial information described above. The electronic device 501 may generate the virtual space 500 in the same or similar scale as the physical space based on the spatial information and may dispose an object in the generated virtual space 500. The electronic device 501 may provide a complete virtual reality (VR) to the user 590 by outputting an image that replacing the entirety of the physical space. The electronic device 501 may provide mixed reality (MR) or AR by outputting an image that replaces a portion of the physical space. In FIG. 5, for ease of description, illustrated is an example that the virtual space 500 where a virtual object 552 is disposed is overlaid on a physical space where the physical object 551, the electronic device 501, and the user 590 are positioned. Although described is establishment of the virtual space 500 based on the spatial information obtained by analyzing the physical space described above, the electronic device 501 may also establish the virtual space 500 regardless of a physical position of the user 590. Herein, the virtual space 500 may be a space corresponding to AR or VR and may be referred to as a metaverse space.

For example, the electronic device 501 may provide virtual graphic representation substituting at least a partial space of the physical space. The electronic device 501 based on OST may output virtual graphic representation by overlaying the virtual graphic representation on a screen area corresponding to the at least partial space in the screen display portion. The electronic device 501 based on VST may output an image that is generated by substituting, with virtual graphic representation, an image area corresponding to at least a partial space in a spatial image that corresponds to a physical space and is rendered based on spatial information. The electronic device 501 may substitute at least a portion of a background in the physical space with virtual graphic representation. However, the example is not limited thereto. The electronic device 501 may perform additional arrangement of the virtual object 552 in the virtual spatial information 500 based on the spatial information without changing the background.

The electronic device 501 may dispose and output the virtual object 552 in the virtual space 500. The electronic device 501 may set a manipulation area of the virtual object 552 to a space (e.g., the volume corresponding to the appearance of the virtual object 552) occupied by the virtual object 552. The manipulation area may be an area where manipulation of the virtual object 552 occurs. In addition, the electronic device 501 may substitute the physical object 551 with the virtual object 552 and may output the virtual object 552. The virtual object 552 corresponding to the physical object 551 may have the same or similar shape to the physical object 551. However, the example is not limited thereto and the electronic device 501 may set the manipulation area only to a space occupied by the physical object 551 or a position corresponding to the physical object 551 without outputting the virtual object 552 substituting the physical object 551. In other words, the electronic device 501 may transmit, to the user 590, visual information (e.g., an image capturing the physical object 551 or light reflected from the physical object 551) representing the physical object 551 without modification and may set the manipulation area to the physical object 551. The manipulation area may be set to have the same shape and volume as the space occupied by the physical object 551 or the virtual object 552, but is not limited thereto. The electronic device 501 may set a manipulation area smaller than the space occupied by the virtual object 552 or the space occupied by the physical object 551.

According to an embodiment, the electronic device 501 may dispose the virtual object 552 (e.g., an avatar object) representing the user 590 in the virtual space 500. When the avatar object is provided in a first-person perspective, the electronic device 501 may visualize graphic representation corresponding to a portion (e.g., a hand, a body, or a leg) of the avatar object to the user 590 through the display (e.g., an OST display or a VST display) described above. However, the example is not limited thereto and when the avatar object is provided in a third-person perspective, the electronic device 501 may visualize graphic representation corresponding to the overall shape (e.g., an appearance from behind) of the avatar object to the user 590 through the display described above. The electronic device 501 may provide an experience integrated with the avatar object to the user 590.

In addition, the electronic device 501 may provide an avatar object of another user entering the same virtual space 500. The electronic device 501 may receive feedback information that is the same or similar to feedback information (e.g., information based on at least one of visual, auditory, or tactile sensation) provided to the another electronic device 501 entering the same virtual space 500. For example, when one object is disposed on a predetermined virtual space 500 and a plurality of users access the virtual space 500, the electronic devices 501 of the plurality of users may receive feedback information (e.g., graphic representation, an audio signal, or haptic feedback) of the same object disposed in the virtual space 500 and may provide the feedback information to each user 590.

The electronic device 501 may detect an input to the avatar object of the other electronic device 501 and may receive feedback information from the avatar object of the electronic device 501. Exchange of feedback and an input for each virtual space 500 may be performed by a server (e.g., the server 108 of FIG. 1). For example, the server (e.g., a server providing a metaverse space) may transmit, to users 590, an input and feedback between an avatar object of the user 590 and an avatar object of the other user. However, the example is not limited thereto and the electronic device 501 may provide an input based on the avatar object or may receive feedback by directly establishing communication with the other electronic device 501.

For example, the electronic device 501 may determine that the physical object 551 corresponding to the selected manipulation area is selected by the user 590 based on detecting an input of the user 590 selecting the manipulation area. The input of the user 590 may include at least one of a gesture input using a body part (e.g., a hand or an eye) or an input using a separate accessory device for VR.

The gesture input may be an input corresponding to an identified gesture based on tracking a body part 510 of the user 590, and may include, for example, an input for indicating or selecting an object. The gesture input may include at least one of a gesture in which a body part (e.g., a hand) heads toward an object more than a predetermined duration, a gesture in which a body part (e.g., a finger, an eye, or the head) points an object, or a gesture in which a body part spatially contacts an object. A gesture of pointing an object with the eye may be identified based on eye gaze tracking. A gesture of pointing an object with the head may be identified based on head tracking.

Tracking the body part 510 of the user 590 may be performed based on a camera of the electronic device 501, but is not limited thereto. The electronic device 501 may track the body part 510 based on cooperation with sensing data (e.g., image data of a camera and depth data of a depth sensor) of a vision sensing data and information (e.g, controller tracking and finger tracking in a controller) collected by an accessory device described below. Finger tracking may be performed by sensing a distance or a contact between an individual finger and a controller based on a sensor (e.g., an infrared sensor) embedded in the controller.

An accessory device for VR may include a ride-on device, a wearable device, a controller device 520, or other sensor-based device. The ride-on device may be a device that the user 590 rides and manipulates and may include, for example, at least one of a treadmill-type device or a chair-type device. The wearable device may be a manipulation device worn on at least a part of the body of the user 590 and may include, for example, at least one of a full or half body suit-type controller, a vest-type controller, a shoe-type controller, a bag-type controller, a glove-type controller (e.g., a haptic glove), or a facial mask-type controller. The controller device 520 may include, for example, an input device (e.g., a stick-type controller or a gun) manipulated by a hand, a foot, a toe, or other body parts 510.

The electronic device 501 may track at least one of a position or a motion of the accessory device by directly establishing communication with the accessory device, but the example is not limited thereto. The electronic device 501 may communicate with the accessory device through a base station for VR.

For example, the electronic device 501 may determine that a corresponding virtual object 552 is selected based on detecting an action of gazing at the virtual object 552 for a predetermined time or more through the eye gaze tracking technique described above. For example, the electronic device 501 may recognize a gesture indicating the virtual object 552 through a hand tracking technique. The electronic device 501 may determine that the corresponding virtual object 552 is selected when a direction in which a tracked hand indicates the virtual object 552 for a predetermined time or more or a hand of the user 590 contacts or enters an area occupied by the virtual object 552 in the virtual space 500. The electronic device 501 may provide feedback described below as a response to the input of the user 590 described above.

The feedback may include visual feedback, auditory feedback, haptic feedback, olfactory feedback, or gustatory feedback. The feedbacks may be rendered by the server 108, the electronic device 101, or the external electronic device 102 described with reference to FIG. 1.

The visual feedback may include an operation of outputting an image through a display (e.g., a transparent display or an opaque display) of the electronic device 501.

The auditory feedback may include an operation of outputting sound through a speaker of the electronic device 501.

The haptic feedback may include force feedback that simulates a weight, a shape, texture, a dimension, and dynamics. For example, a haptic glove may include a haptic element (e.g., an electronic muscle) for simulating tactile sensation by tensing and relaxing the body of the user 590. The haptic element in the haptic glove may function as a tendon. The haptic glove may provide haptic feedback to the entire hand of the user 590. The electronic device 501 may provide feedback representing the shape, size, and rigidity of an object through the haptic glove. For example, the haptic glove may generate a force mimicking the shape, size, and rigidity of an object. The exoskeleton of the haptic glove (or a suit-type device) may include a sensor and a finger motion measurement device and may transmit haptic information to the body by transmitting a force (e.g., a force based on air pressure, electromagnetic, or a DC motor) that pulls a cable to a finger of the user 590. Hardware providing haptic feedback may include a sensor, an actuator, a power, and a wireless transmission circuit. The haptic glove may operate in a manner that expands and contracts an expanding air bag on the surface of the glove.

The electronic device 501 may provide feedback to the user 590 based on selecting an object in the virtual space 500. For example, the electronic device 501 may output graphic representation (e.g., representation that highlights the selected object) indicating the selected object through a display. For example, the electronic device 501 may output sound (e.g., voice) informing the selected object through a speaker. For example, the electronic device 501 may provide, to the user 590, haptic movement that simulates tactile sensation of the object by transmitting an electrical signal to a haptic supporting accessory device (e.g., the haptic glove).

The electronic device according to embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof. Terms such as "1st," "2nd," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., by wire), wirelessly, or via a third element.

As used in connection with embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 6:
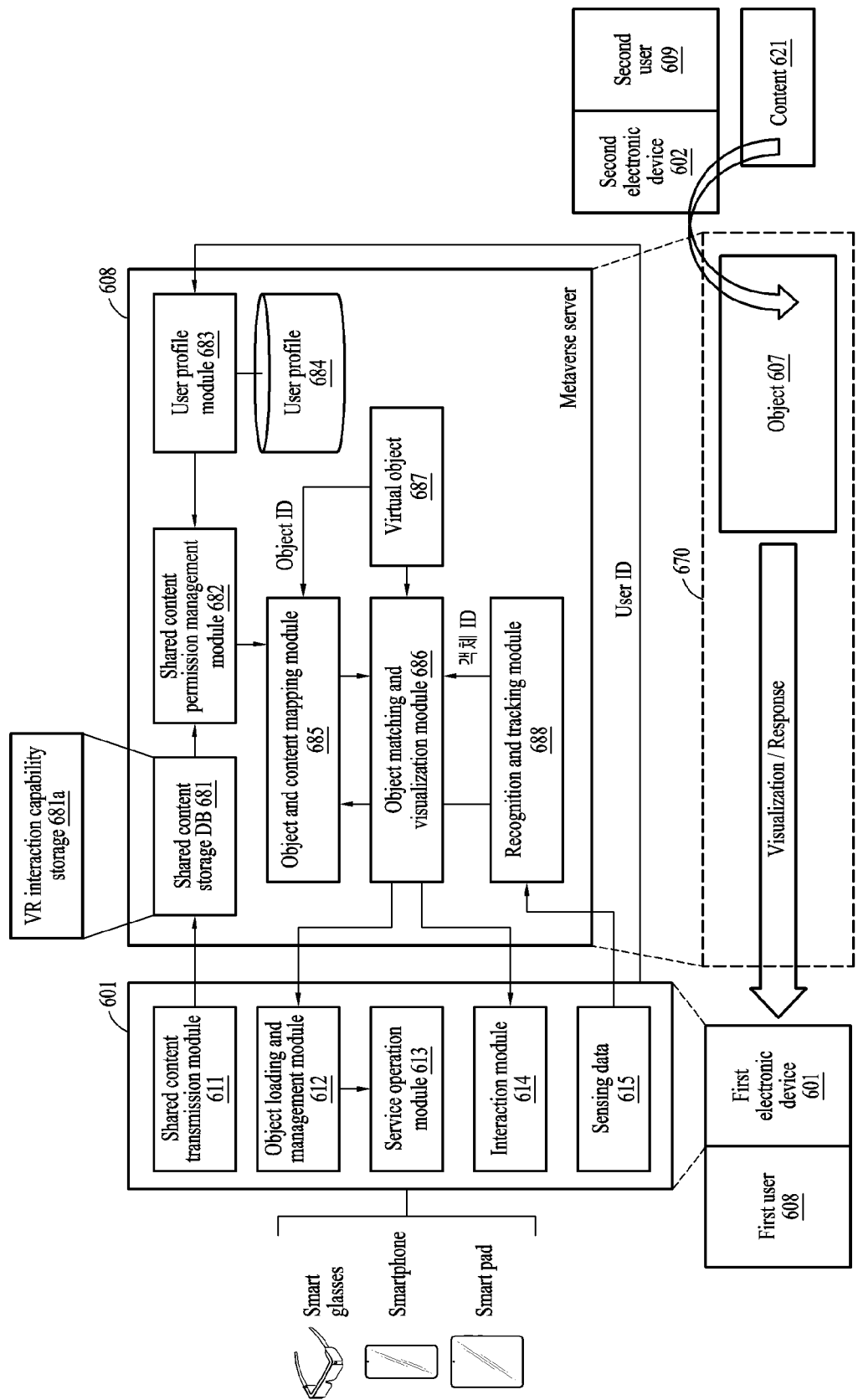
FIG. 6 is a diagram illustrating an example of content sharing based on an object in a virtual space provided by a server according to various embodiments.

FIG. 6 is a diagram illustrating an example of content sharing based on an object in a virtual space provided by a server according to various embodiments.

According to an embodiment, in a metaverse system, electronic devices may interact with each other through a virtual space 670 provided by a server. The virtual space 670 may be a space providing VR. The server may dispose an object 607 (e.g., at least one of a physical object or a virtual object 687) in the virtual space 670. The server may allow a first electronic device 601 to provide shared content 621 (e.g., image visualization, sound playback, or video playback) to the object 607. Herein, provision of the content 621 by the server may include transmission of rendered data that renders at least one of visual information, auditory information, or haptic information of the content 621 described with reference to FIG. 1 or transmission of content data that represents the content 621 itself. Provision of the content 621 by an electronic device may include outputting the rendered data described above using at least one of a display module (e.g., the display module 160 of FIG. 1), an audio module (e.g., the audio module 170 of FIG. 1), or a haptic module (e.g., the haptic module 179 of FIG. 1). For reference, the electronic device may receive and output the rendered data. However, the electronic device may generate the rendered data by itself to output the rendered data to the user based on receiving the content data. In this case, the electronic device may output the rendered data to the user by itself.

The server may include a shared content storage database 681, a shared content permission management module 682, a user profile module 683, a user profile 684, an object and content mapping module 685, an object matching and visualization module 686, the virtual object 687, and a recognition and tracking module 688. For reference, modules described with reference to FIG. 6 may be software modules and operations of each module may be performed by the processors 120 and 181 described with reference to FIG. 1.

The shared content storage database 681 may be a database that stores the shared content 621 for each object 607 in the virtual space 670. The share content storage database 681 may include a VR interaction capability storage 681*a* by object 607, by content, and by device. The VR interaction capability storage 681*a* may store at least one of a VR interaction capability possessed by the object 607, a VR interaction capability possessed by the content 621, or a VR interaction capability possessed by the device.

The VR interaction capability may be a property of an interaction possessed by the object 607, the content 621, or the device (e.g., an AR device). The VR interaction capability may include, for example, a VR output property and a VR input property. The VR output property may include at least one of an output of visual information, an output of auditory information, or an output of haptic information. For example, the VR output property may include sound playback, music playback, video playback, image display, and/or file display. The VR input property may include at least one of a gesture input using a body part (e.g., a hand or an eye), a voice input, or an input using a separate VR accessory device. For example, the gesture input may include a touch input in which a body part contacts the object 607. For example, the input using the accessory device may include a click input manipulating a button of the accessory device while pointing the object 607. The VR interaction capability may include a fee payment property and the fee payment property may include an input for requesting fee payment and an output of a result of fee payment.

The VR interaction capability possessed by the object 607 may include, for example, at least one of a VR output property that may be output from the object 607 or a VR input property that may be received by the object 607. The VR interaction capability possessed by the device may include, for example, at least one of a VR output property that may be output from the device or a VR input property that may be received by the device. The VR interaction capability of the device may be determined depending on hardware components included in the device. The VR interaction capability possessed by the content 621 may include, for example, at least one of a VR output property of the content 621 or a VR input property of the content 621. The server may determine the object 607 to support the content 621 based on at least partial matching of the object 607 to the VR capabilities possessed by the content 621. The server may determine the device to support the object 607 based on at least partial matching of the object 607 to the VR capabilities possessed by the device. The server may determine the device to support the content 621 based on at least partial matching of the content 621 to the VR capabilities possessed by the device.

However, the VR interaction capability is not limited to the example described above. The VR interaction capability may be distinguished by an extension (e.g., ".mp4", ".jpg", and ".pdf"). For example, when the server activates an object, an application may be executed. When an available extension matches an extension of the content in the executed application, the server may determine that the object supports the content.

The server according to an embodiment may provide, to an electronic device accessing the virtual space 670, the object 607 and the content 621 possessing the VR interaction capability supported by electronic device. Referring to Tables 1 and 2 shown below, an example that the shared content 621 is provided to the electronic device based on the VR interaction capability is described. Table 1 may show an example of a VR interaction capability possessed by the content 621 and Table 2 may show an example of a VR interaction capability possessed by the object 607. In Table 1, an application may be an application executed by the server or the electronic device to output the content 621. The object 607 of Table 2 may be the virtual object 687, but may also be a physical object.

TABLE 1

| Content | Application | VR interaction capability |
| --- | --- | --- |
| Music | Music playback application | Music playback |
| Video | Video playback application | Video playback |
| Image | Image viewer | Image display |
| Document files (pdf, word) | File manager | File display |
| Card | Payment application | Fee payment |
| Robot | Robot manipulation application | Physical object manipulation |

TABLE 2

| Object | VR interaction capability |
| --- | --- |
| Television (TV) | Sound playback, Music playback, Video playback, |
| Speaker | Music playback |

TABLE 2-continued

| Object | VR interaction capability |
|---|---|
| Monitor | File display, Video playback |
| Point-of-sale (POS) device | Fee payment |
| Game pad | Physical object manipulation |

For example, the content 621 (e.g., video content) possessing a VR interaction capability of video playback may be shared to the object 607 possessing a video playback property. When a device (e.g., an electronic device) possessing a video playback property accesses the virtual space 670 and selects the shared video content to the object 607 described above, the object 607 may be activated to play the video content. In the virtual space 670, a portion (e.g., an area corresponding to a display in the case of a TV object) of the object 607 or a screen corresponding to the content 621 played around the object 607 may be visualized. The electronic device or the server may execute a video playback application and a portion of the object 607 or a screen corresponding to the video playback application around the object 607 may be visualized. A first user 608 may watch, in the virtual space 670, the content 621 shared by a second user 609 of a second electronic device 602 through the first electronic device 601. Among electronic devices accessing the virtual space 670, the content 621 may be provided only to an electronic device allowed to access the content 621 and the object 607. The server may selectively filter an electronic device to provide the shared content 621 to the object 607 based on the VR interaction capability.

In addition, it is not limited that only the same response operation is provided to the same object 607 and the same content 621. Although the aforementioned example describes a response operation of visually playing the video content 621 in the object 607, when the electronic device possesses only a sound playback property as a VR interaction capability without a video playback property, only the sound of the video content may be played in the electronic device. For example, different response operations may be mapped onto the same object 607 and the same content 621 depending on a VR input property. Determination of a response operation based on a VR interaction capability is described with reference to FIG. 10.

For example, a card content possessing a fee payment property may be shared to a POS object possessing a VR interaction capability of fee payment. The first electronic device 601 may request a payment based on the shared card content by the second user 609 through the POS object.

For example, robot content possessing a VR interaction capability (e.g., a physical object manipulation property) may be shared to a gamepad object possessing a physical object manipulation property. In other words, it may be interpreted that the second user 609 shares a control function of a robot that may be actually manipulated in a physical world through the object 607 of the virtual space 670. The first electronic device 601 may manipulate the robot of the physical world through the gamepad object of the virtual space 670. The manipulation status of the robot may be output to an area around the gamepad object in the virtual space 670 or a different area mapped onto the gamepad object. The manipulation status may be provided to an electronic device of another user in the same virtual space 670 as well as the first user 608.

The shared content permission management module 682 may manage an access permission to the shared content 621 for each user. The access permission to the shared content 621 to the object 607 may include, for example, a permission to allow to share with users in the same virtual space 670 as the object 607 possessing the shared content 621, a permission to allow to share only when a user sharing the content 621 is in the same virtual space 670, or a permission to allow to share to a user designated by a user sharing the content even if the user sharing the content is absent in the same space. For example, when the second user 609 allows to share the content 621 with other users accessing the same virtual space 670, the content 621 may be output to other electronic devices in the virtual space 670 as well as the first electronic device 601 that activates the object 607 possessing the shared content 621. In this case, when another electronic device (e.g., a third electronic device) supports a VR interaction capability of the activated object 607 and the content 621 shared therewith, the shared content 621 may be provided to the third electronic device.

However, the access permission described above is only an example and the example is not limited thereto. The shared content permission management module 682 may manage permissions of the object 607 and the shared content 621 to the object 607 based on the aforementioned VR interaction capability. For example, the shared content permission management module 682 may allow an access permission to an individual electronic device accessing the virtual space 670 to access the object 607 and/or the content 621 possessing a VR interaction capability that matches the individual electronic device.

The user profile module 683 may manage a profile of a user account. The user profile 684 may include an ID of a user account.

The object and content mapping module 685 may map the shared content 621 onto the object 607 based on the VR interaction capability storage 681a. For example, the object and content mapping module 685 may map the content 621 that is requested to be shared by the second user 609 onto the object 607 possessing the same VR interaction capability in the virtual space 670. The object and content mapping module 685 may perform mapping by searching for the object 607 possessing the same VR interaction capability in the virtual space 670, but the example is not limited thereto. The object and content mapping module 685 may determine whether the object 607 designated by the second electronic device 602 supports the content 621 to be shared and may perform mapping based on a determination result.

The object matching and visualization module 686 may match the position and shape of the object 607 in the virtual space 670 and may generate graphic data and/or rendered data for visualization of a 3D appearance. The graphic data may include at least one of the position, size, texture, color, or shape of the object 607. The object matching and visualization module 686 may dispose and match the object 607 in the virtual space 670. The server may transmit the graphic data and/or the rendered data to an electronic device. The electronic device may output the graphic data and/or the rendered data through a display described with reference to FIGS. 1 to 5. The server may store information on the virtual object 687 disposed in the virtual space 670.

The recognition and tracking module 688 may recognize the object 607 and the virtual space 670 based on the electronic device based on sensing data 615 of the electronic device and may track a position change. For reference, illustrated is that the recognition and tracking module 688 may be included in the server, but is not limited thereto. The electronic device may recognize and track a relative position change of the object 607 and the virtual space 670 based on the sensing data 615 by itself.

The electronic device may include a shared content transmission module 611, an object loading and management module 612, a service operation module 613, an interaction module 614, and the sensing data 615. The electronic device may be implemented in various AR devices (e.g., a smart glasses device, a smartphone, a smart pad, or a personal computer (PC)). Each of the modules described herein may include various circuitry (e.g., processing circuitry) and/or executable program instructions.

The shared content transmission module 611 may transmit at least one content 621 to be shared to the server. The shared content transmission module 611 may transmit, to the server, the content 621 (e.g., a movie, music, a document file, a picture, or a credit card) to be shared by a user. As described above, the server may set sharing of the content 621 with the object 607 based on a VR interaction capability of the object 607 (e.g., a TV, a speaker, a PC, or a monitor) in the virtual space 670 and a VR interaction capability of the content 621 to be shared.

The object loading and management module 612 may load the objects 607 included in an FOV of the electronic device in the virtual space 670. The object loading and management module 612 may manage information on the objects in the virtual space 670.

The service operation module 613 may operate a service for providing the virtual space 670 and the object 607 in the virtual space 670. For example, the service operation module 613 may generate rendering data that visualizes the loaded object 607 and the virtual space 670 and may output the rendered data through a display of the electronic device.

The interaction module 614 may perform interaction between the user and the object 607 in the virtual space 670. For example, the interaction module 614 may detect a user input (e.g., a gesture input and a voice input) to the object 607.

The sensing data 615 may be data sensed by a sensor module (e.g., the sensor module 176 of FIG. 1) of the electronic device. The electronic device may identify a physical position and a posture of the electronic device based on the sensing data 615. The electronic device may determine a scene (e.g., a scene corresponding to an FOV) of the virtual space 670 to be provided through the display based on the identified physical position and the posture.

In the metaverse system according to an embodiment, the object 607 may be the virtual object 687 or a physical object onto which the content 621 to be shared is mapped in the virtual space 670 and may include, for example, a TV, a speaker, a frame, or an audio device. The first user 608 may be a user to access the content 621 shared to the object 607 and the first electronic device 601 may be a device of the first user 608. The second user 609 may be a user to share the content 621 to the object 607 and the second electronic device 602 may be a device of the second user 609. As described above, when the first electronic device 601 supports the object 607 and the content 621, the object 607 and the content 621 may be viewable to the first user 608 through the display of the first electronic device 601. For example, when a VR interaction capability of the first electronic device 601 matches VR interaction capabilities of the object 607 and the content 621, an access permission to the object 607 and the content 621 may be granted to the first electronic device 601. Mapping of at least two of the electronic device, a response operation, the content 621, or the object 607 based on the VR interaction capability may be performed by the server.

Figure 7:
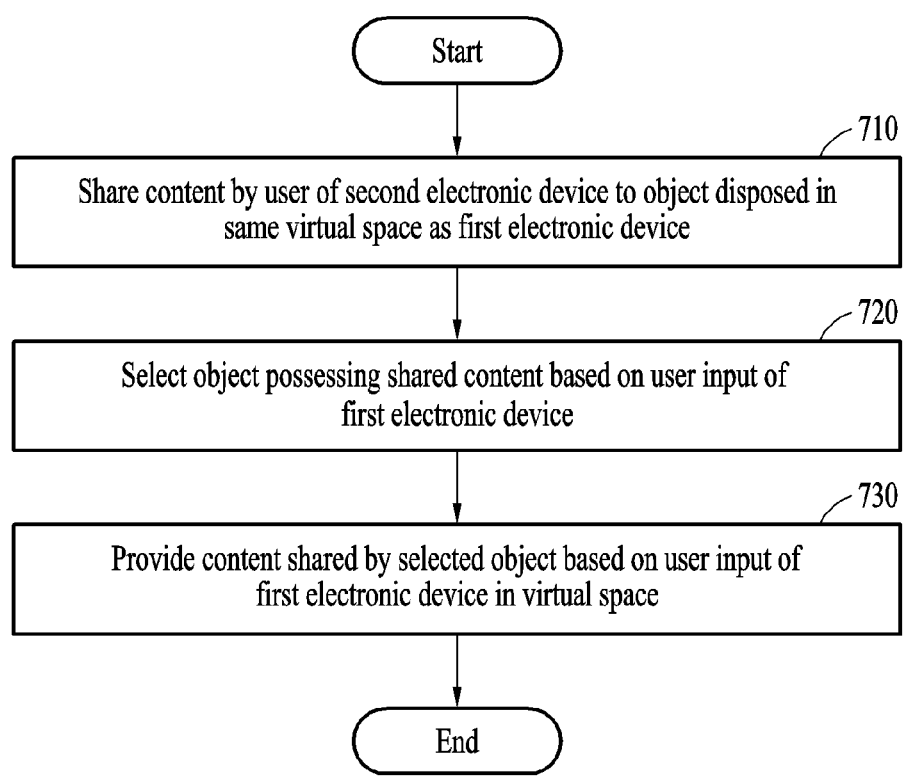
FIG. 7 is a flowchart illustrating an example method of providing content shared with an object according to various embodiments.

FIG. 7 is a flowchart illustrating an example method of providing content shared with an object according to various embodiments.

In operation 710, a processor included in a server (e.g., the server 108 of FIG. 1) may be configured to share content by a user of a second electronic device to an object in a same virtual space as a first electronic device. The second electronic device may be a device to share the content in the virtual space. For example, the server may determine an object that is able to map the content to be shared based on a VR interaction capability described with reference to FIG. 6. The server may determine a VR interaction capability of the object and a VR interaction capability of the content based on the VR interaction capability storage 681*a* of FIG. 6. For example, when a TV object is disposed in a virtual space, the server may grant, to the TV object, a property for processing a video file (e.g., a video playback property), a property for processing an image file (e.g., an image display property), and a property for processing a music file (e.g., a music playback property). The server may map content possessing VR capability information that matches the object onto the object. The content mapped onto the object may be shared with a user accessing the virtual space. An example of operation 710 is described in greater detail below with reference to FIGS. 8 and 9.

In addition, the server may set an access permission to at least one of the object or the content mapped onto the object based on the VR interaction capability. The server may be set to grant an access permission to at least one of the object or the content to an electronic device possessing a VR interaction capability the same as or similar to VR interaction capabilities of the object and the content. For example, when the electronic device accesses the virtual space, the server may be set to determine whether to grant an access permission to the object and the content in the virtual space based on the VR interaction capability described above.

In operation 720, the processor included in the server may be configured to select an object possessing the shared content based on a user input of the first electronic device. The server may identify an object indicated by the user input of the first electronic device in the virtual space. The server may determine whether the identified object supports the user input. For example, the server may determine whether the identified object supports the user input based on whether the VR interaction capability of the identified object matches the VR interaction capability of the user input. The server may determine that an object having a response operation corresponding to the VR interaction capability of the user input supports the user input. An object having a response operation corresponding to a click input property may support a user input of the same property (e.g., a click input). In addition, the server may determine whether the first electronic device supports the identified object. For example, the server may determine whether the VR interaction capability of the identified object matches the VR interaction capability of the first electronic device. The server may select the identified object based on the identified object and the first electronic device having the matched VR interaction capabilities. For example, the server may allow an access permission to the object to the electronic device having the same VR interaction capability as the object. An example of operation 720 is described in greater detail below with reference to FIGS. 10 and 11.

In operation 730, the processor included in the server may be configured to provide the content shared by the selected object in the virtual space based on the user input of the first electronic device. The server may determine whether the VR interaction capability of the object matches the VR interaction capability of the first electronic device based on the user input indicating the content shared to the object. The server may activate the object to which the content is shared based on partial matching between VR capabilities of the content and the first electronic device. For example, the server may allow an access permission to the content to the first electronic device possessing the VR interaction capability that matches the content. For example, when the first electronic device does not possess a sound playback property and possesses an image display property, the server may allow the first electronic device to only display an image among the content shared to the TV object. For example, when a speaker object possessing a music playback property is in the virtual space, the server may grant a permission to the first electronic device having the music playback property to play a music file shared to the speaker object.

The activated object may be an object that is set to provide content to an electronic device of a user having an access permission to the object and the content among users accessing the virtual space. In at least a portion or an adjacent area of the activated object, the server may visualize the content shared to the object. Accordingly, the content shared to the object may be provided to another electronic device (e.g., a third electronic device) as well as the first electronic device that activates the object. An example of operation 730 is described in greater detail below with reference to FIGS. 12, 13, 14 and 15.

For reference, the example describes that operations of FIG. 7 are performed by the server (e.g., the processor included in the server), but the example is not limited thereto. For example, a processor included in at least one of the first electronic device, the second electronic device, the another electronic device, or the server may cooperatively perform operations described above. For reference, herein, operations by the first electronic device, the second electronic device, the another electronic device, or the server may be performed by a processor included in each device.

Figure 8:
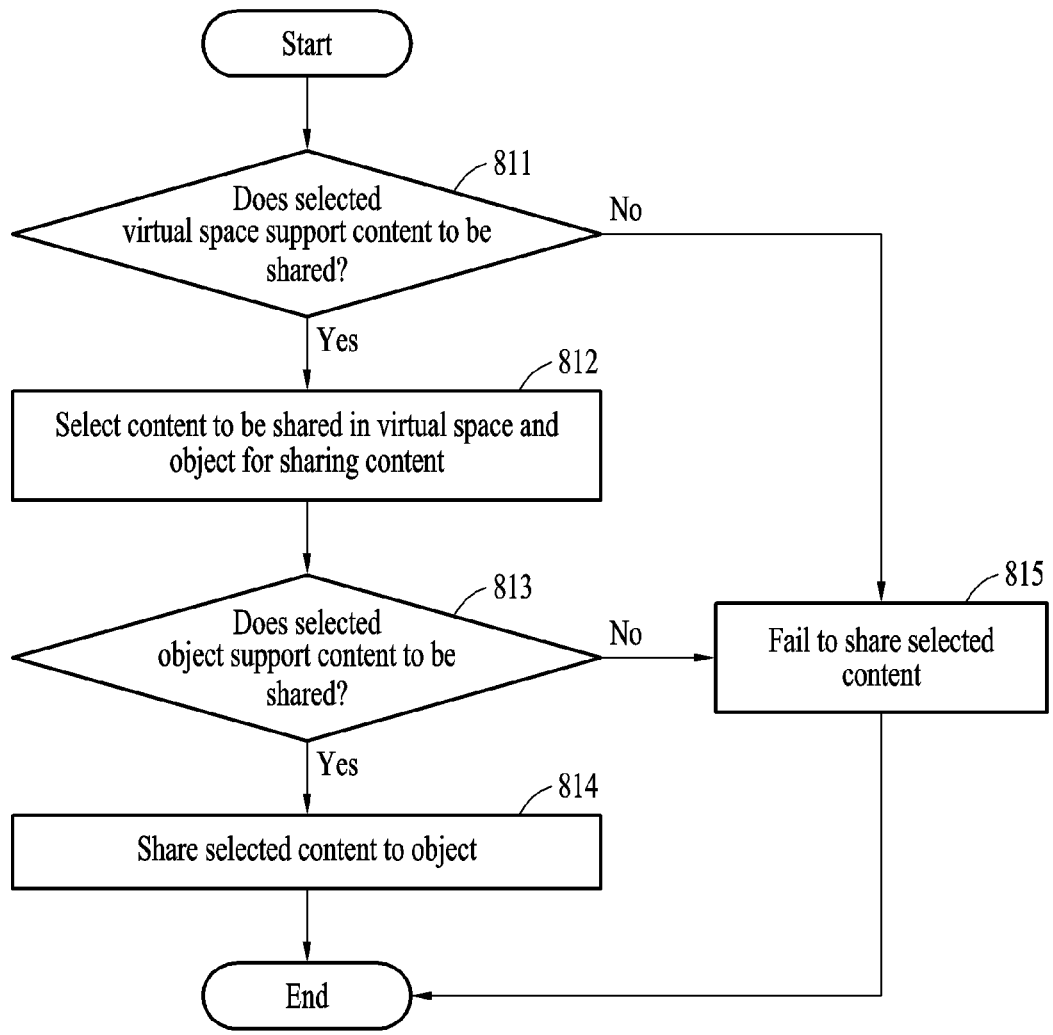
FIGS. 8 and 9 include a flowchart and a diagram illustrating an example of an operation of sharing content with an object according to various embodiments.
Figure 9:
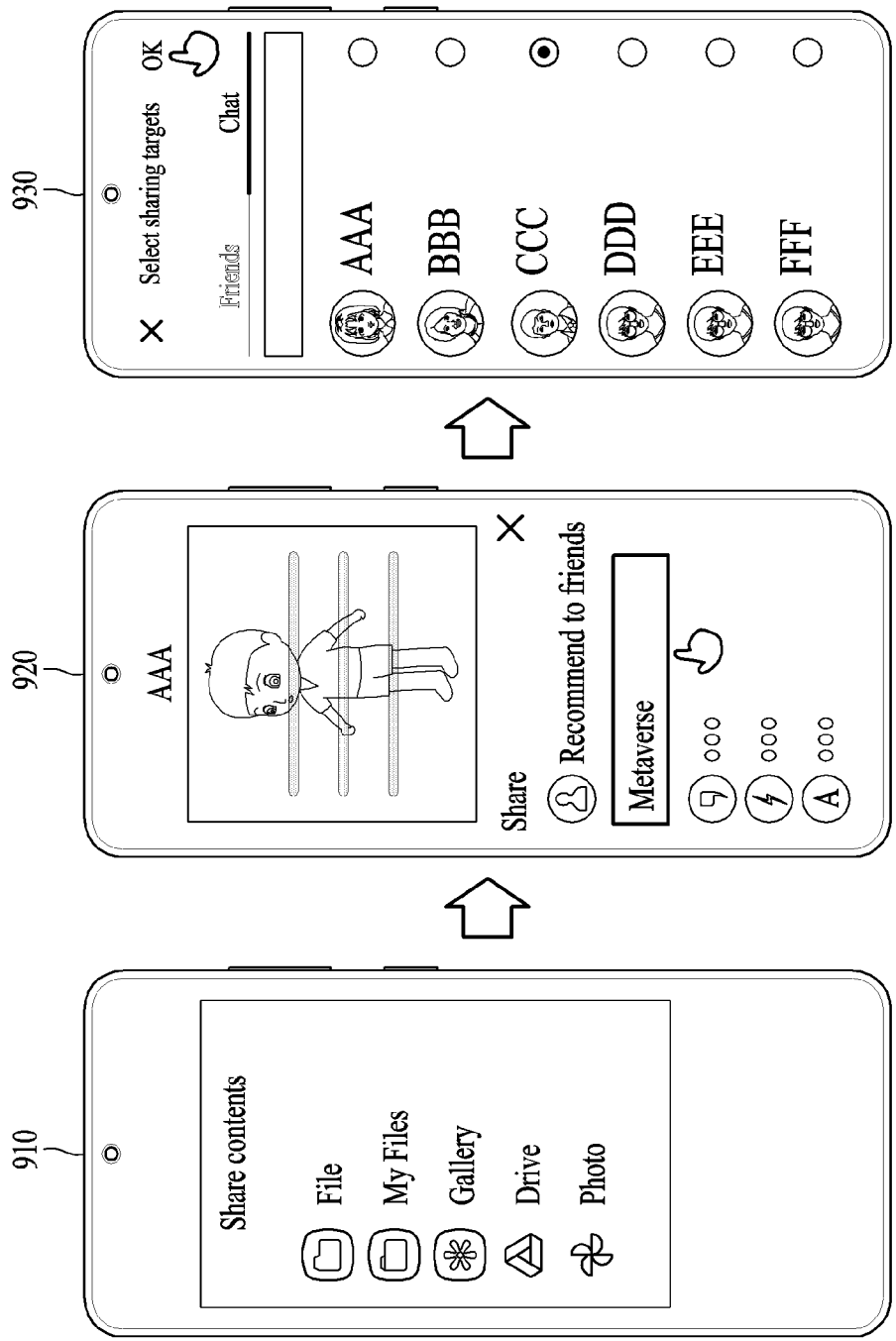

FIGS. 8 and 9 include a flowchart and a diagram illustrating an example of an operation of sharing content with an object according to various embodiments.

In operation 811, a server (e.g., the server 108 of FIG. 1) may determine whether a selected virtual space supports content to be shared. For example, when at least one of objects in the selected virtual space matches a VR interaction capability of the content, the server may determine that the virtual space supports the content. In the example illustrated in FIG. 9, an electronic device (e.g., the second electronic device 602 of FIG. 6) may select content to be shared by an input of a second user in a first interface 910. The electronic device may select a virtual space to share the content by the input of the second user in a second interface 920. However, as shown in FIG. 9, providing a content sharing trigger point in a smartphone is an example and the interface of the electronic device for sharing content is not limited thereto. After accessing the virtual space, the electronic device may select content to be shared in the virtual space. In addition, the content sharing service may be provided in various trigger points.

In operation 812, based on the virtual space supporting the content to be shared (e.g., operation 811), the server may select the content to be shared in the virtual space and an object for sharing the content. For example, based on a user input of the second electronic device, the server may select an object to which the content is shared among objects in the virtual space. The server may present, to the second electronic device, at least one candidate object possessing a VR interaction capability that matches the content to be shared among a plurality of objects in the virtual space. The second electronic device may select an object to which the content is shared from at least one candidate object.

In operation 813, the server may determine whether the selected object supports the content to be shared. For example, when the VR interaction capability of the content to be shared matches the VR interaction capability of the selected object, the server may determine that the object supports the content.

However, in operations 812 and 813 described above, described is the example that an object is selected based on the input of the second user who desires to share the content, but the example is not limited thereto. The server may search for an object that supports sharing of the content designated by the second electronic device among at least one object in the virtual space. Accordingly, the server may automatically search for and select an object that supports the content to be shared in the virtual space without an explicit selection input of the second user. For example, when the second electronic device shares music content in the virtual space, the shared music content may be mapped onto at least one of objects supporting a music playback property in the virtual space. For other objects without the music playback property, mapping of the music content may be automatically disabled. Similarly, when the second electronic device shares photo content in the virtual space, objects (e.g., a frame or a TV object) supporting the image display property in the virtual space may be automatically selected.

In operation 814, the server may share the selected content to the object based on the virtual space or the selected object selected in the virtual space supporting (e.g., operation 813) the content to be shared. For example, the server may share content to the found object based on the object that supports sharing of the content being found.

In operation 815, the server may fail to share the selected content based on the virtual space or the selected object in the virtual space not supporting the content to be shared (e.g., operation 811—No or operation 813—No). For example, when the VR interaction capability of the content does not match VR interaction capabilities of all objects in the virtual space, the server may not perform mapping of the content on the object.

For reference, a third interface 930 for designating a user account to which the content is shared is illustrated in FIG. 9. When a user account that is able to access the content is designated, the server may allow only the first electronic device that accesses the virtual space with the user account to access the content.

Figure 10:
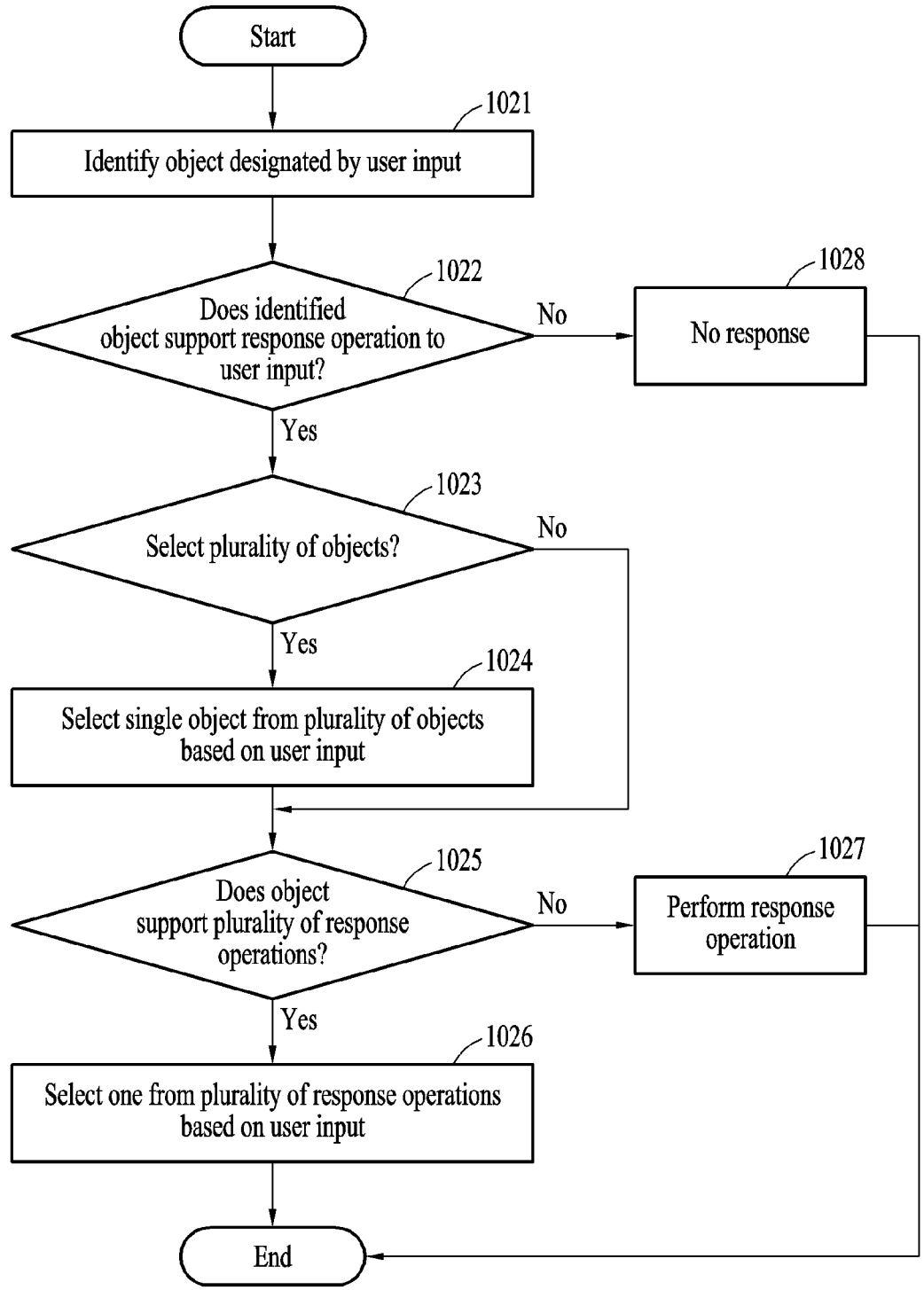
FIGS. 10 and 11 include a flowchart and a diagram illustrating an example of operations of selecting and responding to an object according to various embodiments.
Figure 11:
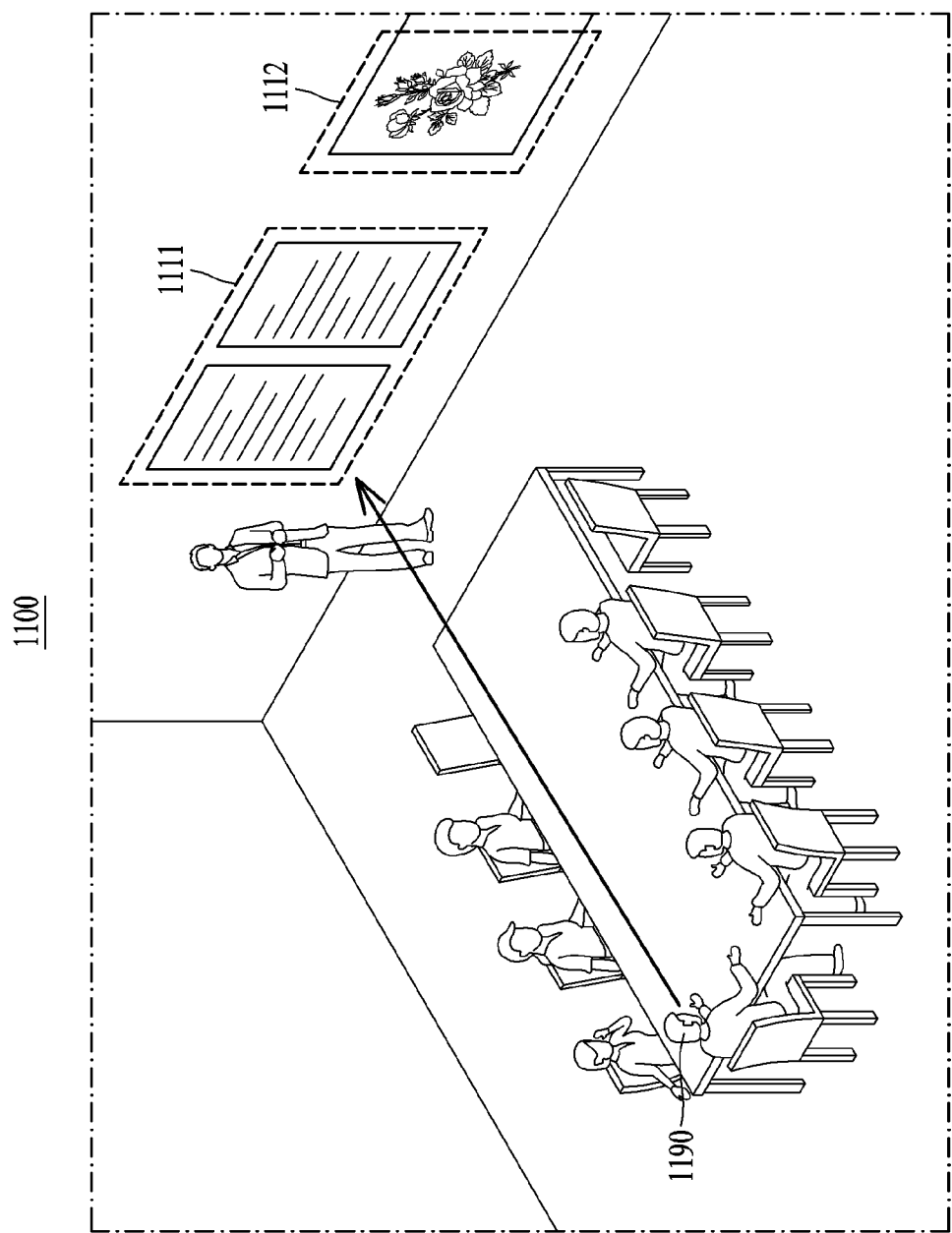

FIGS. 10 and 11 include a flowchart and a diagram illustrating an example of operations of selecting and responding to an object according to various embodiments.

In operation 1021, a server (e.g., the server 108 of FIG. 1) may identify an object designated by a user input. For example, based on a first electronic device (e.g., the electronic device 601 of FIG. 6) receiving a voice input from a first user, the server may identify an object that supports the voice input in the virtual space. For example, the first electronic device may identify an object in a range (e.g., a partial area in the virtual space pointed by a gesture) corresponding to a gesture input or an input of an accessory device. FIG. 11 illustrates an example that a first user 1190 (e.g., illustrated in the form of an avatar) selects a monitor object 1111 in a virtual space 1100 with eye gaze. A TV object 1112 may not be selected because the TV object 1112 is out of a range of eye gaze.

In operation 1022, the server may determine whether the identified object supports a response operation to the user input. For example, the server may determine a VR interaction capability of the user input by analyzing the user input. For example, based on the server receiving a voice utterance input of "Play" of a first user from a first electronic device, the server may identify a music playback property and a video playback property from the voice utterance input. For example, based on the server receiving a gesture input activating a playback feature of the object from the first electronic device, the server may identify the music playback property and the video playback property. The server may determine whether a VR interaction capability that is analyzed for the user input matches a VR interaction capability of the object. When the object has a response operation corresponding to the matched VR interaction capability, the server may determine that the object supports a response operation to the user input. For reference, when the object has a plurality of VR interaction capabilities, response operations may be differently assigned to VR interaction capabilities. In operation 1028, when the object does not support a response operation to the user input (e.g., operation 1022—No), the server may indicate no response.

In operation 1023, when the object supports a response operation to the user input (e.g., operation 1022—Yes), the server may determine that a plurality of objects are selected. For example, in operation 1021, a plurality of candidate objects corresponding to the input of the first user may be selected. When the plurality of objects are selected (e.g., operation 1023—Yes), in operation 1024, the server may select a single object from the plurality of objects based on the user input. For example, the server may target the single object among the plurality of objects using an additional input (e.g., eye gaze or finger pointing) of the first user of the first electronic device. When the plurality of objects is not selected (e.g., operation 1023—No), for example, when the single object is selected, the server may determine whether a plurality of response operations is supported in the selected object in operation 1025 described below.

In operation 1025, the server may determine whether the object supports the plurality of response operations. For example, based on an object indicated by a user input supporting the user input, the server may provide, to the first electronic device, a result (e.g., graphic representation) of applying a response operation corresponding to the user input.

For example, in operation 1027, based on the object supporting only one response operation (e.g., operation 1025—No), the server may cause the object to perform the response operation. For example, the response operation may include at least one of visualization of the content shared to the object, outputting sound, providing haptic feedback, moving to next content, moving to previous content, pausing content playback, and/or terminating content playback. For example, in response to a user input (e.g., a touch or a click input) for selecting one of contents shared to the object, the server may apply graphic representation that highlights the selected content as the response operation. In addition, the server may play the content shared to the object in response to an utterance of "play". In response to a drag input or a swipe input to the object, the server may output next or previous content (e.g., an image, a video, or a photo). Accordingly, the server may find an object that matches the VR input property of the user and may determine a response operation of the found object based on the matched VR input property. When the shared content is an image, the server may display a next or previous image in response to a drag input. When the shared content is music, the server may play next or previous music in response to a drag input. In addition, when the first electronic device utters "music play" in a virtual space where multiple objects (e.g., a TV object and a speaker object) supporting the music playback property exist, the server may provide response operations (e.g., music playback) of the objects. Thereafter, the first electronic device may select or change an object to play the music based on a touch input, a drag input, or a gaze gesture.

For example, in operation 1026, based on the object supporting the plurality of response operations (e.g., operation 1025—Yes), the server may select an operation from the plurality of response operations based on the user input. From the utterance of "play", the music playback property and the video playback property may be identified as the VR interaction capability. When a TV object in the virtual space possesses both the music playback property and the video playback property, the server may provide, to the first electronic device, a selection interface for response operations (e.g., music playback or video playback) corresponding to multiple VR interaction capabilities. The server may perform the selected response operation from the plurality of response operations.

FIGS. 12, 13, 14 and 15 include flowcharts and diagrams illustrating an example of an operation of activating an object for content sharing according to various embodiments.

Figure 12:
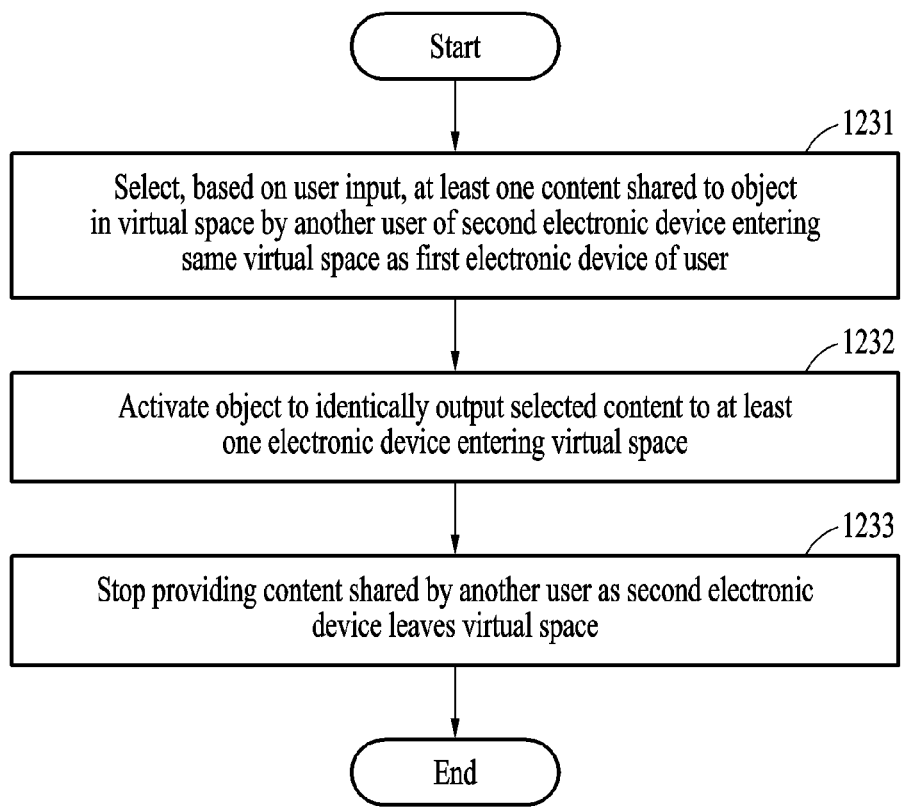
FIGS. 12, 13, 14 and 15 include flowcharts and diagrams illustrating an example of an operation of activating an object for content sharing according to various embodiments.

FIG. 12 is a flowchart illustrating an example operation of maintaining content shared to an object while a first user and a second user are in a same virtual space according to various embodiments.

In operation 1231, a server (e.g., the server 108 of FIG. 1) may select, based on an input of a user, at least one content shared to the object in the virtual space by another user entering the same virtual space as the user. For example, the server may select an object based on an input of a first user and may select content shared to the selected object based on the input of the first user. For example, selection of the object may be performed as described above with reference to FIG. 10. The server may present, to the first electronic device, content that is supportable by a first electronic device among at least one content shared to the object as available content. For example, the first electronic device may visualize a list of available contents received from the server through a display. The first electronic device may select one from the list of available contents based on an input (e.g., a gesture input) of the first user. The first electronic device and/or the server may determine a response operation for the selected content based on the input of the first user. For example, the first electronic device and/or the server may select the content in response to a touch input to a button for selecting the content. The first electronic device and/or the server may play the content in response to a touch input to a button for playing the content.

In addition, based on a plurality of second users individually sharing content to a same target object in the virtual space, the server may present, to the first electronic device that selects the target object, a plurality of contents shared by the plurality of second users. The first electronic device may select available content to the first electronic device from a plurality of contents shared by the plurality of second users. Accordingly, the content shared by multiple users accessing the same virtual space may be shared to one object in a complex manner.

In operation 1232, the server may activate an object to identically output the selected content to a plurality of users entering the virtual space. For example, in operation 1231 described above, the server may activate the object by applying, to the object, a response operation determined based on an input of the first user. For example, the response operation may be an output (e.g., image display, video playback, and music playback) of the content in a portion of the object or a peripheral area of the object. The server may provide the content based on the activated object to another electronic device (e.g., the third electronic device) accessing the virtual space. The server may provide the object to which the response operation is applied to a third electronic device that matches VR interaction capabilities of the object and the content among the plurality of electronic devices accessing the virtual space. The third electronic device may output the content shared to the object to a third user. Accordingly, the server may commonly provide, to the first user and the third user, the content based on the object activated by the first user. The first user and the third user may experience the same VR. In addition, when the second user sets an access permission based on a user account to the content, the server may provide the content to only an electronic device accessing the virtual space with the allowed user account to access.

However, for the third electronic device without the VR interaction capability matching the shared content, provision of the shared content may be limited. For example, the server may determine that an electronic device without a speaker does not have a sound playback property. The electronic device without the sound playback property may not output sound playing the content in the virtual space where the object having the content with the sound playback property is activated. In addition, an electronic device that is not connected to a wearable glove device may not have a click input property. The server may limit an electronic device without the click input property to access an object or content having the click input property. Based on the third electronic device accessing the virtual space not supporting the selected content, the server may limit visualization of the selected content based on the activated object for the third electronic device.

In operation 1233, the server may stop providing the shared content by another user based on the another user leaving the virtual space. For example, when the second electronic device of the second user sharing the content to the object leaves the virtual space, the server may remove the content shared to the object. When the second electronic device leaves and the content is already provided through an activated object, the server may terminate outputting the content.

In addition, based on some of the second users leaving the virtual space, the server may maintain the content shared to the target object by the other second users. For example, the server may stop sharing the content of the left second user and may continue to share the content shared by the remaining second users.

Figure 13:
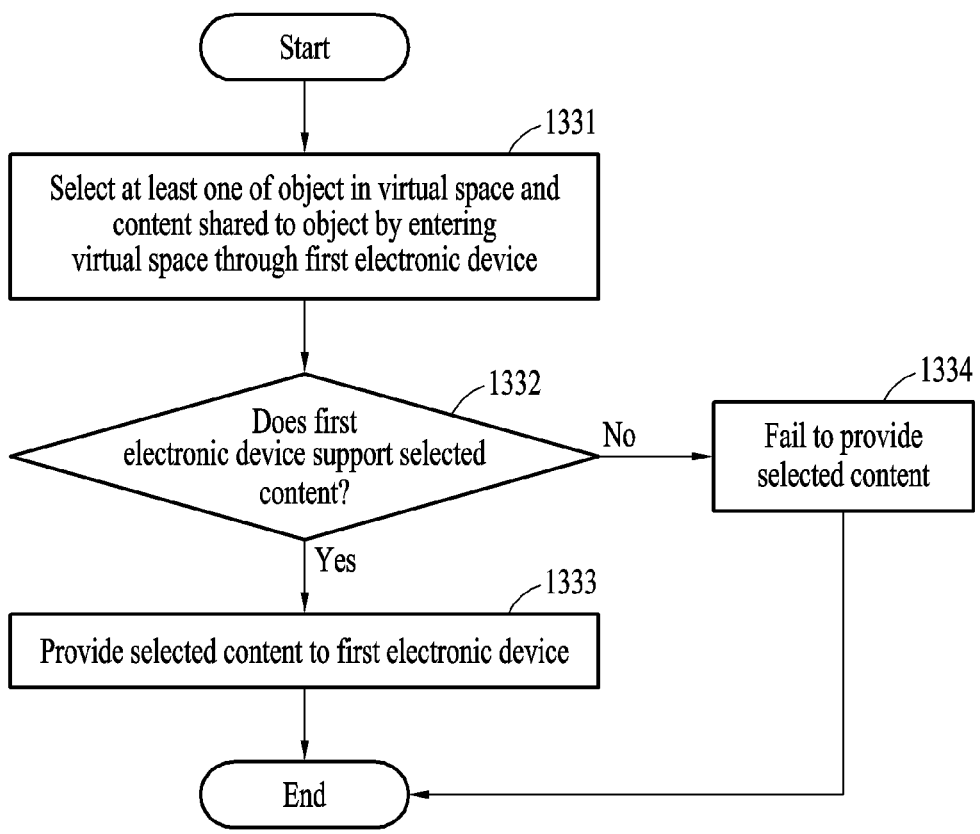

FIG. 13 is a flowchart illustrating an example operation of providing a content based on whether an electronic device supports the content according to various embodiments.

In operation 1331, a first user may enter a virtual space through a first electronic device and may select at least one of an object in the virtual space and contents shared to the object. For example, the first electronic device may select a content indicated by an input of the first user from contents shared to the object.

In operation 1332, the server may determine whether the first electronic device supports the selected content. For example, the server may determine whether a VR interaction capability of the content matches a VR interaction capability of the first electronic device. In operation 1334, the server or the first electronic device may fail to provide the content based on the first electronic device not supporting the selected content (e.g., operation 1332—No). In addition, although not illustrated in FIG. 13, provision of the content may not be attempted and may be terminated based on the first electronic device not supporting the selected content (e.g., operation 1332—No).

In operation 1333, the server may provide the selected content to the first electronic device based on the first electronic device supporting the selected content (e.g., operation 1032—Yes). The server may trigger visualization based on the object of the selected content in the first electronic device based on the first electronic device supporting the selected content. For example, the server may transmit data that renders the content to the first electronic device and the first electronic device may output the rendered data to the first user.

Figure 14:
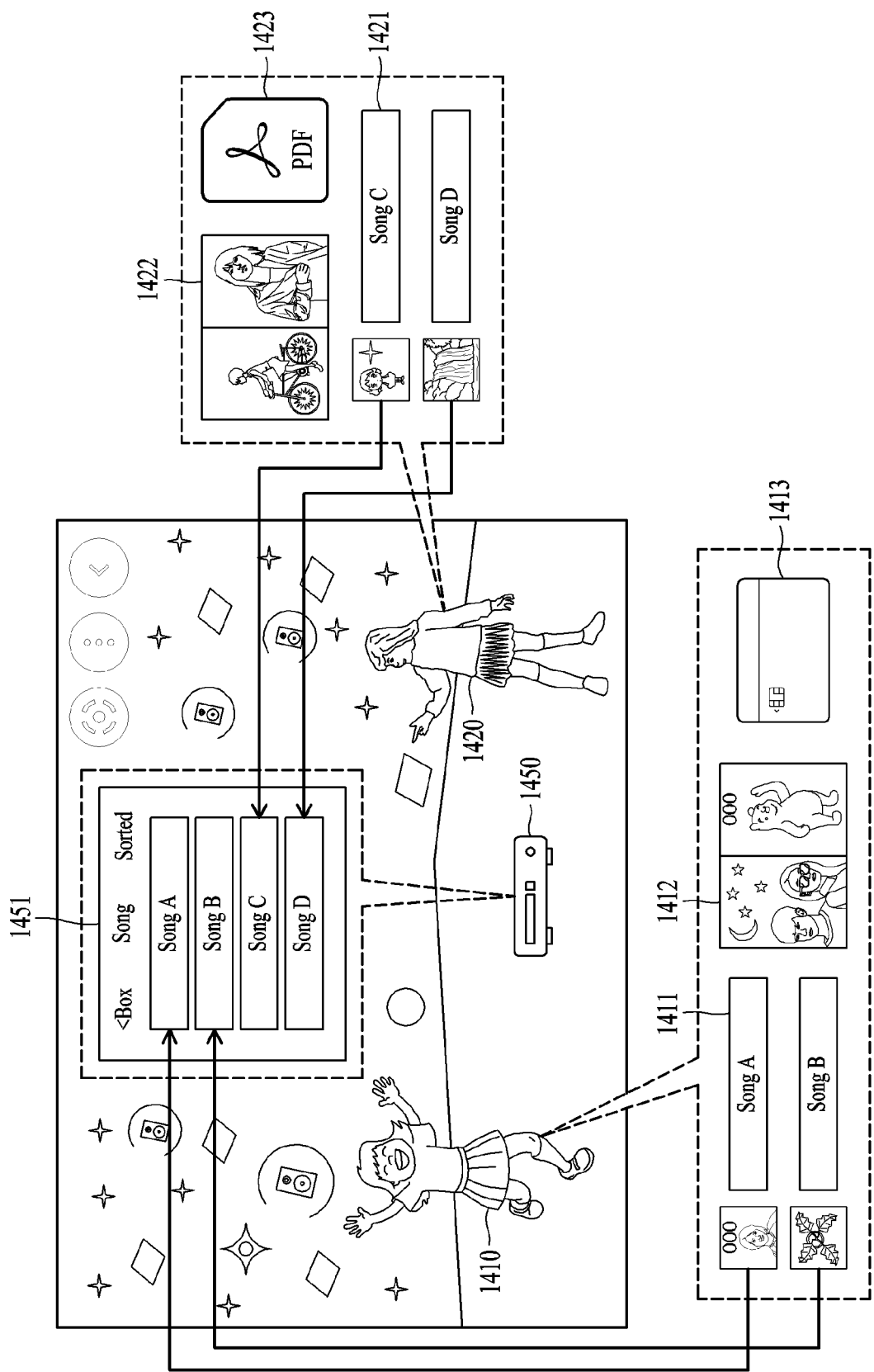

FIG. 14 is a diagram illustrating an example of a scenario of shared content by a plurality of second users according to various embodiments.

For example, a second user 1410 may share a song content 1411, a movie content 1412, and a card content 1413 in a virtual space through an electronic device. Another second user 1420 may share a song content 1421, a movie content 1422, and a document content 1423 in the virtual space through an electronic device. The server may automatically share the song contents 1411 and 1422 among the shared content in the virtual space to an audio object 1450 possessing a music playback property. A first user (not illustrated) may access the virtual space through a first electronic device and may select the audio object 1450. The first electronic device may include a speaker and may possess a VR interaction capability of a music playback property. As described above, the VR interaction capability of the electronic device may be determined based on a surrounding device that may be used by the electronic device. The first electronic device may receive a content list 1451 shared to the selected audio object 1450 and may output the content list 1451 to the first user through a display.

According to an embodiment, based on the object supporting some output formats among multiple output formats of the content shared to the object, the server may provide the content in some output formats based on the object. For example, an example that the song contents 1411 and 1422 are shared to the audio object 1450 is described with reference to FIG. 14, but the example is not limited thereto. The movie contents 1412 and 1422 may possess multiple VR interaction capabilities, which are a sound playback property and a video playback property. The audio object 1450 may support the sound playback property among the multiple VR interaction capabilities. The movie contents 1412 and 1422 may be shared to the audio object 1450 as the sound playback property. In this case, when the first electronic device selects one of the movie contents 1412 and 1422 from the audio object 1450, only the sound of the selected movie content may be output to the first user.

According to an embodiment, the server may proceed to payment using a payment method of the second user by the first user based on the payment method of the second user being shared to the object. The object may have a function to purchase a service and/or a product connected to the object and a VR interaction capability of the object having the purchase function may include a fee payment property. The object having the fee payment property may support card content. When the first electronic device activates the object to which the card content is shared, the server may operate a payment service to purchase a service and/or a product connected to the object or may provide an external store that provides a payment service to the first electronic device. For example, the audio object 1450 may have a purchase function for a sound source that a user does not own. The card content 1413 may be shared to the audio object 1450. When the first electronic device selects the card content 1413 from the audio object 1450, an interface for purchasing the sound source may be provided. The first electronic device may request payment to purchase the sound source in the virtual space using the card content 1413 shared by the first user 1410. The server may transmit a payment request to an external payment server, may receive a payment result (e.g., payment approval or payment failure) from the external payment server and transmit the payment result to the first electronic device.

According to an embodiment, based on an access permission to a physical object being shared to the object, the server may control an operation of the physical object based on an input of the first user. Although FIG. 14 describes an example that the content is shared to the virtual object (e.g., an audio object), the example is not limited thereto. A physical object that may be manipulated by the second electronic device may be shared to an object in the virtual space. The first electronic device may control the physical object (e.g., a robot and a mechanical simulator) shared by the second user by selecting and activating a manipulation content from the object. For reference, when the content is shared to a physical object that may be manipulated, the server or the electronic device may provide the content by manipulating the physical object or may provide the content based on a virtual object (e.g., graphic representation overlaid on the physical object) corresponding to the physical object. For example, in the case of a TV object, the server or the electronic device may play a video content through a display of a physical TV in response to a user input. In this case, the content played on the physical TV may be exposed to another person in a physical space where the physical TV is disposed. For example, the server or the electronic device may play the video content on TV-shaped graphic representation corresponding to the physical TV. In this case, because the content is not played on the physical TV, the content may not be exposed to other people in the physical space where the physical TV is disposed.

In addition, when electronic devices are physically in the same space but access different virtual spaces, each electronic device may receive feedback that is different from feedback provided to other electronic devices. For example, the first electronic device accessing the virtual space of FIG. 14 from an arbitrary physical space may output music, which is the content shared to the audio object 1450. Even if in the same physical space, the audio object 1450 may not be visible to another electronic device accessing a different virtual space and music may not be output to the electronic device. For example, when a physical conference room is set to be a virtual space, the first electronic device physically entering the physical conference room may access the virtual space. The first electronic device may output, to the user, a visual content (e.g., a document content that is shared and output through a monitor object) provided in the virtual space corresponding to the conference room. The visual content may not be output to a user and an electronic device outside the conference room. Accordingly, even if in the same physical space, security may be secured depending on whether the virtual spaces are identical.

Figure 15:
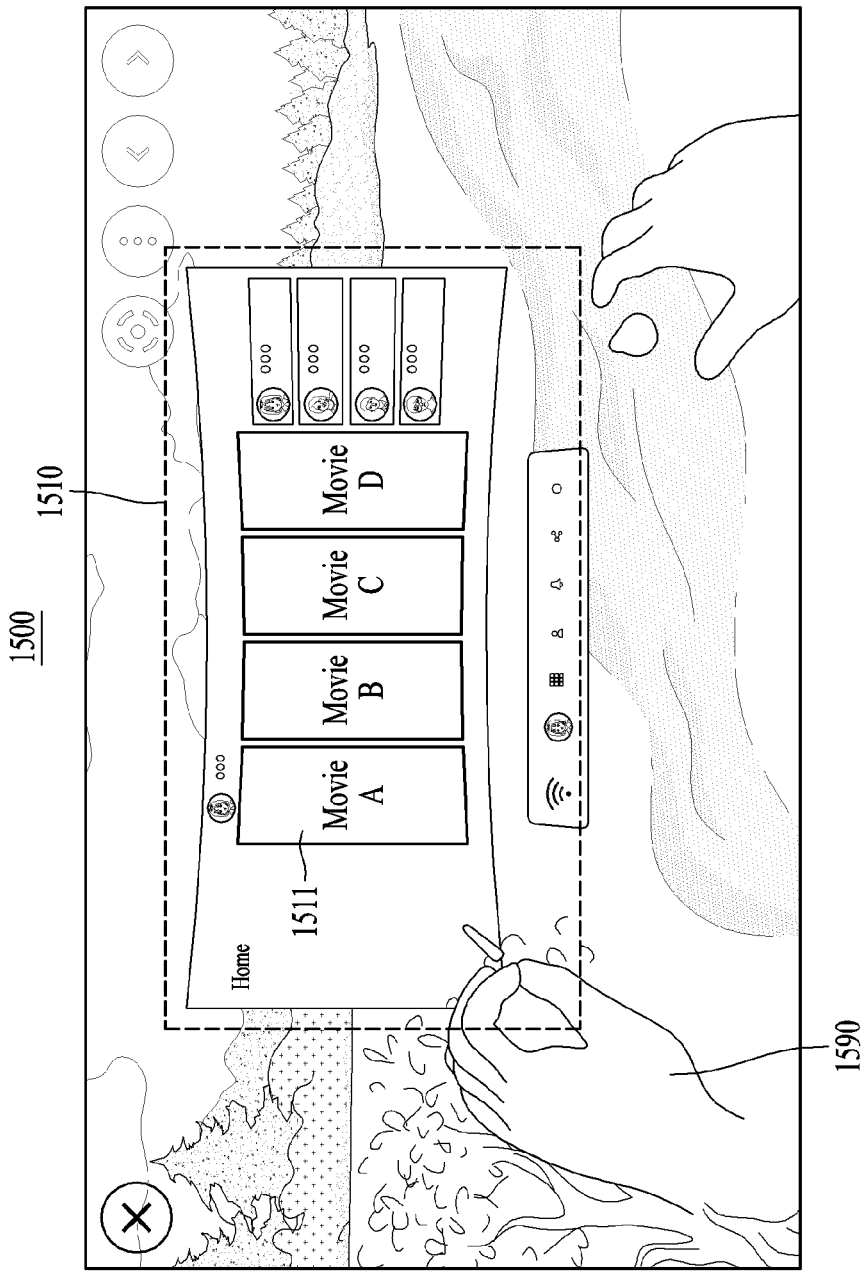

FIG. 15 is a diagram illustrating an example operation of selecting a content based on an input of a first user from contents shared to an object according to various embodiments.

According to an embodiment, when the first electronic device selects an object (e.g., a PC object), the first electronic device may provide a list 1510 of contents shared to the object. For example, as shown in a scene 1500 of FIG. 15, the first electronic device may visually output, to a first user, the content shared to the object. In FIG. 15, a movie content 1511 may be shared to the object. The first electronic device may select one from the shared content based on a result of tracking a body part 1590 (e.g., a hand) of the first user. The first electronic device may output the selected content to the first user. For example, based on the content shared to the object including at least one of sound, music, a photo, a video, or a document, the server may provide visualization of the content to an electronic device accessing the virtual space.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A server comprising:
   a communication module comprising communication circuitry configured to establish communication between a first electronic device of a user and a second electronic device of another user and provide, to the first electronic device and the second electronic device, a virtual space and an object in the virtual space;
   a memory configured to store computer-executable instructions; and
   at least one processor, comprising processor circuitry, configured to execute the instructions by accessing the memory,
   wherein the instructions, when executed by the at least one processor, individually and/or collectively, configure the server to:
   find an object that supports sharing of a content designated by the second electronic device among at least one object in the virtual space;
   based on the object that supports sharing of the content being found, share the content to the found object;
   select, based on an input of the user, at least one content shared to the object in the virtual space by the another user of the second electronic device entering a same virtual space as the first electronic device,
   activate the object to identically output the selected content to at least one electronic device entering the virtual space, and
   based on the second electronic device leaving the virtual space, stop providing the content shared by the other user.

2. The server of claim 1, wherein the instructions, when executed by the at least one processor, individually and/or collectively, further configure the server to:
   based on a plurality of second users individually sharing the content to a same target object in the virtual space, present a plurality of contents shared by the plurality of second users to the first electronic device that selects the same target object, and based on some of the plurality of second users leaving the virtual space, maintain the content shared to the target object by a different second user.

3. The server of claim 1, wherein the instructions, when executed by the at least one processor, individually and/or collectively, further configure the server to:

based on the object indicated by the input of the user supporting the input of the user, provide a result of applying a response operation corresponding to the input of the user to the object to the first electronic device.

4. The server of claim 1, wherein the instructions, when executed by the at least one processor, individually and/or collectively, further configure the server to:

based on the first electronic device supporting the selected content, trigger visualization of the selected content based on the object in the first electronic device.

5. The server of claim 1, wherein the instructions, when executed by the at least one processor, individually and/or collectively, further configure the server to:

based on a third electronic device accessing the virtual space not supporting the selected content, limit visualization of the selected content based on the activated object to the third electronic device.

6. The server of claim 1, wherein the instructions, when executed by the at least one processor, individually and/or collectively, further configure the server to:

provide visualization of the content to an electronic device accessing the virtual space based on the content shared to the object comprising at least one of sound, music, a photo, a video, or a document.

7. The server of claim 1, wherein the instructions, when executed by the at least one processor, individually and/or collectively, further configure the server to:

based on the object supporting some output formats of multiple output formats of the content shared to the object, provide the content in the some output formats based on the object.

8. The server of claim 1, wherein the instructions, when executed by the at least one processor, individually and/or collectively, further configure the server to:

process payment using a payment method of a second user by a first user based on the payment method of the second user being shared to the object.

9. The server of claim 1, wherein the instructions, when executed by the at least one processor, individually and/or collectively, further configure the server to:

based on an access permission to a physical object being shared to the object, control an operation of the physical object based on an input of a first user.

10. A method implemented by at least one processor, comprising processor circuitry, the method comprising:

finding an object that supports sharing of a content designated by a second electronic device among at least one object in a virtual space;

based on the object that supports sharing of the content being found, sharing the content to the found object;

selecting, based on an input of a user, at least one content shared to an object in the virtual space by another user of the second electronic device entering a same virtual space as a first electronic device;

activating the object to identically output the selected content to at least one electronic device entering the virtual space; and based on the second electronic device leaving the virtual space, stopping providing the content shared by the another user.

11. The method of claim 10, further comprising:

based on a plurality of second users individually sharing the content to a same target object in the virtual space, presenting a plurality of contents shared by the plurality of second users to the first electronic device that selects the same target object; and based on some of the plurality of second users leaving the virtual space, maintaining the content shared to the target object by a different second user.

12. The method of claim 10, wherein the selecting of the at least one content based on the input of the user comprises:

based on the object indicated by the input of the user supporting the input of the user, providing a result of applying a response operation corresponding to the input of the user to the object to the first electronic device.

13. The method of claim 10, wherein the activating of the object comprises:

based on the first electronic device supporting the selected content, triggering visualization of the selected content based on the object in the first electronic device.

14. The method of claim 10, further comprising:

based on a third electronic device accessing the virtual space not supporting the selected content, limiting visualization of the selected content based on the activated object to the third electronic device.

15. The method of claim 10, wherein the activating of the object comprises:

providing visualization of the content to an electronic device accessing the virtual space based on the content shared to the object comprising at least one of sound, music, a photo, a video, or a document.

16. The method of claim 10, wherein the activating of the object comprises:

based on the object supporting some output formats of multiple output formats of the content shared to the object, providing the content in the some output formats based on the object.

17. The method of claim 10, wherein the activating of the object comprises:

processing payment using a payment method of a second user by a first user based on the payment method of the second user being shared to the object.

18. The method of claim 10, wherein the activating of the object comprises:

based on an access permission to a physical object being shared to the object, controlling an operation of the physical object based on an input of a first user.

* * * * *